(12) United States Patent
Shibata et al.

(10) Patent No.: US 8,213,772 B2
(45) Date of Patent: Jul. 3, 2012

(54) EDITING APPARATUS, EDITING METHOD, AND PROGRAM

(75) Inventors: Yoshiaki Shibata, Kanagawa (JP); Mitsutoshi Shinkai, Kanagawa (JP)

(73) Assignee: Sony Corporation, Tokyo (JP)

( * ) Notice: Subject to any disclaimer, the term of this patent is extended or adjusted under 35 U.S.C. 154(b) by 1404 days.

(21) Appl. No.: 11/824,462

(22) Filed: Jun. 29, 2007

(65) Prior Publication Data

US 2008/0008442 A1   Jan. 10, 2008

(30) Foreign Application Priority Data

Jun. 30, 2006   (JP) ................. 2006-181323

(51) Int. Cl.
*H04N 5/93* (2006.01)
*G11B 27/00* (2006.01)

(52) U.S. Cl. ....................... 386/278; 386/287

(58) Field of Classification Search .............. 386/278, 386/281, 287
See application file for complete search history.

(56) References Cited

U.S. PATENT DOCUMENTS

| 5,719,643 | A | 2/1998 | Nakajima |
| 6,035,304 | A | 3/2000 | Machida et al. |
| 6,775,466 | B1 | 8/2004 | Koshino et al. |
| 7,228,055 | B2* | 6/2007 | Murakami et al. ............ 386/285 |
| 2002/0199204 | A1 | 12/2002 | Mory et al. |
| 2003/0085997 | A1 | 5/2003 | Takagi et al. |
| 2005/0027745 | A1* | 2/2005 | Sohma et al. .............. 707/104.1 |
| 2005/0149557 | A1 | 7/2005 | Moriya et al. |
| 2006/0088297 | A1* | 4/2006 | Iguchi et al. ................. 386/117 |

FOREIGN PATENT DOCUMENTS

| JP | 10 174043 | 6/1998 |
| JP | 11 339051 | 12/1999 |
| JP | 2000 350182 | 12/2000 |
| JP | 2003 244615 | 8/2003 |
| JP | 2003 280971 | 10/2003 |
| JP | 2006 109160 | 4/2006 |

* cited by examiner

*Primary Examiner* — Thai Tran
*Assistant Examiner* — Nigar Chowdhury
(74) *Attorney, Agent, or Firm* — Frommer Lawrence & Haug LLP; William S. Frommer; Russell P. Blaise

(57) ABSTRACT

An editing apparatus for performing editing in which a second video is added to or inserted into a first video, includes: an editing unit performing the editing; a generating unit generating a first electronic mark indicating characteristics of the first video, as an edited video electronic mark, which is an electronic mark indicating characteristics of an edited video obtained as the result of the editing; a detecting unit detecting, of the first electronic marks, a first electronic mark indicating characteristics of a first video corresponding to an editing section, as an invalid electronic mark; and a deleting unit deleting the invalid electronic mark from the edited video electronic marks.

7 Claims, 22 Drawing Sheets

IN POINT

IN POINT

IN POINT

FIG. 6

```
1: <EssenceMarkTable targetEssence="Clip 5">
2:   <EssenceMark value="REC START" frameCount="0"/>
3:   <EssenceMark value="TOP OF THE SECOND INNING" frameCount="10"/>
4:   <EssenceMark value="NICHIRO TO BATTER'S BOX" frameCount="300"/>
5:   <EssenceMark value="NICHIRO HOMERUN" frameCount="1500"/>
6: </EssenceMarkTable>
```

FIG. 8

```
1: <EssenceMarkTable targetEssence="Clip L1">
2:   <EssenceMark value="REC START" frameCount="0"/>
3:   <EssenceMark value="CUT POINT" frameCount="ADur(11)"/>
4:   <EssenceMark value="CUT POINT" frameCount="ADur(11)+Dur(12)"/>
    ...
5:   <EssenceMark value="CUT POINT" frameCount="ADur(11)+Dur(12)+ ... +Dur(n)"/>
6: </EssenceMarkTable>
```

FIG. 10

```
1: <EssenceMarkTable targetEssence="Clip L₂">
2:   <EssenceMark value="REC START" frameCount="0"/>
3:   <EssenceMark value="CUT POINT" frameCount="ADur(21)"/>
4:   <EssenceMark value="CUT POINT" frameCount="ADur(21)+Dur(22)"/>
5:   <EssenceMark value="NICHIRO HOMERUN" frameCount="ADur(21)+Dur(22)+offSet(23)"/>
6: </EssenceMarkTable>
```

FIG. 12

```
1: <EssenceMarkTable targetEssence="Clip L3">
2:   <EssenceMark value="REC START" frameCount="0"/>
3:   <EssenceMark value="CUT POINT" frameCount="In(31)"/>
4:   <EssenceMark value="CUT POINT" frameCount="In(31)+Dur(32)"/>
5: </EssenceMarkTable>
```

FIG. 14

```
1: <EssenceMarkTable targetEssence="Clip L4">
2:   <EssenceMark value="REC START" frameCount="0"/>
3:   <EssenceMark value="CUT POINT" frameCount="In(41)"/>
4:   <EssenceMark value="NICHIRO HOMERUN" frameCount="In(41)+offSet(42)"/>
5:   <EssenceMark value="CUT POINT" frameCount="In(41)+Dur(42)"/>
6: </EssenceMarkTable>
```

FIG. 18

```
1: <smil xmlns="...">
2:   <body>
3:     <video src="Clip 51"  clipBegin="1500" clipEnd="2800"/>
4:     <video src="Clip 52"  clipBegin="500"  clipEnd="1800"/>
5:     <video src="Clip 53"  clipBegin="50"   clipEnd="1350"/>
6:   </body>
7: </smil>
```

FIG. 19

```
1: <EssenceMarkTable targetEssence = "Clip m">
2:   <EssenceMark value = "REC START" frameCount="0"/>
3:   <EssenceMark value = "NICHIRO HOMERUN" frameCount= "700"/>
4:   <EssenceMark value = "CUT POINT" frameCount= "1300"/>
5:   <EssenceMark value = "MATSUOKA HOMERUN" frameCount= "1520"/>
6:   <EssenceMark value = "CUT POINT" frameCount= "2600"/>
7:   <EssenceMark value = "FUKUDA HOMERUN" frameCount= "3700"/>
8: </EssenceMarkTable>
```

FIG. 23

```
1: <EssenceMarkTable targetEssence = "Clip k">
2:   <EssenceMark value = "REC START"  frameCount = "0"/>
3:   <EssenceMark value = "TOP OF THE SECOND INNING"  frameCount = "500"/>
4:   <EssenceMark value = "CUT POINT"  frameCount = "500"/>
5:   <EssenceMark value = "NICHIRO HOMERUN"  frameCount = "1500"/>
6: </EssenceMarkTable>
```

EDITING APPARATUS, EDITING METHOD, AND PROGRAM

CROSS REFERENCES TO RELATED APPLICATIONS

The present invention contains subject matter related to Japanese Patent Application JP 2006-181323 filed in the Japanese Patent Office on JUNE 30, 2006, the entire contents of which are incorporated herein by reference.

BACKGROUND OF THE INVENTION

1. Field of the Invention

The present invention relates to an editing apparatus, an editing method, and a program, and particularly relates to an editing apparatus, an editing method, and a program, whereby consistency of electronic marks indicating the characteristics of a video can be completely ensured before and after editing of the video.

2. Description of the Related Art

Conventionally, linear editing such as Assemble Edit and Insert Edit has been performed with editing apparatuses.

Now, linear editing will be described with reference to FIGS. 1A through 1C.

In FIGS. 1A through 1C, let us say that data obtained by shooting video (including acquisition of audio) is being edited in increments of clips. Note that the term "clip" refers to, for example, video data obtained by shooting video one time (the processing of shooting video from the start of shooting to the end of shooting), and the audio data accompanying the video data. Also, in the following description, a clip #i represents a clip assigned i as a UMID (Unique Material Identifier). While the UMID assigned to the clips in the following description will be one- or two-digit numbers for the sake of facilitating description, an actual UMID is a number created based on a method stipulated in the SMPTE (Society of Motion Picture and Television Engineers) 330M standard.

First, Assemble Edit will be described with reference to FIGS. 1A and 1B.

Assemble Edit is editing wherein a sub-clip, which is a section of data of a clip to be used for editing, is added to another clip.

As shown in FIG. 1A, let us say that a user specifies a section of a clip #2 to be taken as a sub-clip #2, and specifies the end position of a clip #1 which is the start position of the editing section to serve as an in point. In this case, the editing apparatus performs Assemble Edit wherein the sub-clip #2, which is data of a predetermined section of the clip #2, is added to the entirety of clip #1. Accordingly, following data from the start to the end of the clip #1, data from the start to the end of the sub-clip #2 is recorded.

Also, as shown in FIG. 1B, let us say that a user specifies a section of the clip #2 to be taken as the sub-clip #2, and specifies the a desired position of the clip #1 to serve as the start position of the editing section. In this case, in the event that a position on the clip #1 corresponding to the end position of the sub-clip #2 does not exist between the start position to the end position of the clip #1, the editing apparatus performs Assemble Edit wherein the sub-clip #2 is added to a part of the clip #1. Accordingly, following data from the start to the in point of the clip #1, data from the start to the end of the sub-clip #2 is recorded.

Next, Insert Edit will be described with reference to FIG. 1C.

Insert Edit is editing wherein a sub-clip of one clip is inserted into another clip by overwriting.

As shown in FIG. 1C, let us say that a user specifies a section of the clip #2 to be taken as the sub-clip #2, and specifies a desired position of the clip #1 to serve as the start position of the editing section. In this case, in the event that a position on the clip #1 corresponding to the end position of the sub-clip #2 exists between the start position to the end position of the clip #1, the editing apparatus performs Insert Edit wherein the sub-clip #2 is inserted to the clip #1. Accordingly, data from the in point of the clip #1 is overwritten by the data from the start to the end of the sub-clip #2. That is to say, data from the start to the end of the sub-clip #2 is inserted in a section from the in point of the clip #1 to a position therefrom by a distance equivalent to the length of the sub-clip #2.

Next, description will be made regarding editing processing wherein the editing apparatus performs the Assemble Edit or Insert Edit described with reference to FIGS. 1A through 1C.

In step S1, the editing apparatus takes data of a section of clip #2, which the user desires, as a sub-clip #2, and the flow proceeds to step S2.

In step S2, the editing apparatus determines an in point based on a position within the clip #1 specified by the ser as the in point, and the flow proceeds to step S3.

In step S3, the editing apparatus determines whether or not the in point is the end position of the clip #1, i.e., whether or not the sub-clip #2 is to be subjected to Assemble Edit to the entirety of the clip #1. In the event that determination is made that the in point is the end position of the clip #1, the flow proceeds to step S4.

In step S4, the editing apparatus adds the sub-clip #2 to the clip #1. That is to say, the editing apparatus records the data from the start to the end of the sub-clip #2, following the data from the start to the end of the clip #1. Thus, the editing apparatus performs the Assemble Edit for adding the sub-clip #2 to the entirety of the clip #1 as shown in FIG. 1A, by performing the processing of steps S1 through S4.

In step S3, in the event that determination is made that the in point is not the end position of the clip #1, the flow proceeds to step S5, where the editing apparatus determines whether or not a position on the clip #1 corresponding to the end position of the sub-clip #2 exists between the start position to the end position of the clip #1, i.e., whether or not to perform Insert Edit.

In the event that determination is made in step S5 that the position on the clip #1 corresponding to the end position of the sub-clip #2 does not exist between the start position to the end position of the clip #1, the flow proceeds to step S6, where the editing apparatus deletes the data of the clip #1 from the in point to the end position, and proceeds to the above-described step S4. In step S4, the editing apparatus adds the sub-clip #2 to the clip #1. Consequently, data from the start to the end of the sub-clip #2 is recorded following data from the start to the in point of the clip #1 following deletion.

Thus, the editing apparatus performs Assemble Edit wherein the sub-clip #2 is added to a part of the clip #1 as shown in FIG. 1B, by performing the processing of steps S1, S2, S3, S5, and S6.

On the other hand, the event that determination is made in step S5 that the position on the clip #1 corresponding to the end position of the sub-clip #2 exists between the start position to the end position of the clip #1, the flow proceeds to step S7, where the editing apparatus takes a section on the clip #1 from the in point to a point of the clip #1 corresponding to the end position of the sub-clip #2, i.e., a section from the in point to a position therefrom equivalent to the length of the sub-clip #2, as the editing section, and overwrites this editing section with the sub-clip #2. Thus, the editing apparatus performs Insert Edit shown in FIG. 1C, by performing the processing of steps S1, S3, S5, and S7.

Now, in recent years, there are cases wherein metadata (e.g., electronic marks indicating characters of video) indicating the contents or characteristics of video are recorded along with the video in the recording medium. In this case, the editing apparatus needs to process the metadata when editing.

Accordingly, there is known a moving picture managing apparatus which, in the event that operations such as editing are performed regarding a part or all of moving pictures to which metadata has been applied, records information relating to the possibility that the metadata might become invalid, thereby easily rectifying the metadata so as to be useful following editing. An example of such an apparatus is described in US Published Patent Application No. 2005/0027745.

Also, there is known an apparatus which, in the event that a recorded region is overwritten by other video/audio data, index information corresponding to the overwritten video/audio data and index information corresponding to the other regions divided by the video/audio data which is overwritten on the overwritten region are generated. An example of such an apparatus is described in U.S. Pat. No. 6,775,466.

On the other hand, there is known an apparatus which is capable of editing index information for specifying thumbnail images which aid in editing. An example of such an apparatus is described in Japanese Unexamined Patent Application Publication No. 10-174043.

Note that index information is a basic sort of structure description metadata describing the way in which a program is structured, based on the contents thereof, such as TOC (Table of Contents) data of a program, for satisfying requests to access certain positions of video or programs recorded in a recording medium speedily.

This structure description metadata is not only used for access desired positions at high speeds as with a TOC, but also is used for auto-generating and transmitting sample clips or customized programs according to user requests, realizing partial access right control of programs, and so-called authoring wherein completed packets are copied to packaged media.

Various methods have been conceived for generating such structure description metadata, as described in US Published Patent Application Nos. 2002/0199204 and 2005/0149557.

On the other hand, in recent years, various methods have been conceived for detecting cut points, representing positions where scenes in the video switch, such as U.S. Pat. No. 5,719,643, Japanese Unexamined Patent Application Publication No. 10-339051.

SUMMARY OF THE INVENTION

However, with the moving image managing apparatus described in US Published Patent Application No. 2005/0027745, metadata which is invalid following editing the video remains recorded, so the validity of metadata has to be determined each time the metadata is referred to. Accordingly, the above-described moving image managing apparatus cannot be said to have completely ensured consistency of metadata before and after editing video.

There has been recognized the need to completely ensure consistency of electronic marks indicating the characteristics of video, before and after editing the video.

According to an embodiment of the present invention, an editing apparatus for performing editing in which a second video is added to or inserted into a first video, includes: an editing unit performing the editing; a generating unit generating a first electronic mark indicating characteristics of the first video, as an edited video electronic mark, which is an electronic mark indicating characteristics of an edited video obtained as the result of the editing; a detecting unit detecting, of the first electronic marks, a first electronic mark indicating characteristics of a first video corresponding to an editing section, as an invalid electronic mark; and a deleting unit deleting the invalid electronic mark from the edited video electronic marks.

The generating unit may further generate a second electronic mark indicating characteristics of the second video, as the edited video electronic mark.

The generating unit may further generate a section electronic mark which is an electronic mark indicating at least one of a start position and end position of the editing section as characteristics of the edited video, as the edited video electronic mark.

The editing apparatus may further include a reception unit receiving operations to specify a desired position for the edited video by a user; the generating unit generating a desired position electronic mark which is an electronic mark indicating characteristics of the edited video at the desired position, as the edited video electronic mark, in response to the operations.

The first electronic mark may have added thereto succession information representing whether or not first electronic mark is to be succeeded in the edited video; with the generating unit effecting succession of the characteristics indicated by, of the invalid electronic marks, an invalid mark to which succession information representing succession in the edited video has been added, as characteristics at a predetermined position of the edited video, and generates a succession electronic mark indicating the characteristics as the edited video electronic mark.

According to an embodiment of the present invention, an editing method of an editing apparatus for performing editing in which a second video is added to or inserted into a first video, includes the steps of: performing the editing; generating a first electronic mark indicating characteristics of the first video, as an edited video electronic mark, which is an electronic mark indicating characteristics of an edited video obtained as the result of the editing; detecting, of the first electronic marks, a first electronic mark indicating characteristics of a first video corresponding to an editing section, as an invalid electronic mark; and deleting the invalid electronic mark from the edited video electronic marks.

According to an embodiment of the present invention, a program for causing a computer to execute editing processing in which a second video is added to or inserted into a first video, includes the steps of: performing the editing; generating a first electronic mark indicating characteristics of the first video, as an edited video electronic mark, which is an electronic mark indicating characteristics of an edited video obtained as the result of the editing; detecting, of the first electronic marks, a first electronic mark indicating characteristics of a first video corresponding to an editing section, as an invalid electronic mark; and deleting the invalid electronic mark from the edited video electronic marks.

According to an embodiment of the present invention, editing is performed in which a second video is added to or inserted into a first video, a first electronic mark indicating characteristics of the first video is generated as an edited video electronic mark, which is an electronic mark indicating characteristics of an edited video obtained as the result of the editing, a first electronic mark indicating characteristics of a first video corresponding to an editing section is detected from the first electronic marks, as an invalid electronic mark, and the invalid electronic mark is deleted from the edited video electronic marks.

Thus, according to the configurations described above, consistency of electronic marks indicating the characteristics of video can be completely ensured before and after editing the video.

BRIEF DESCRIPTION OF THE DRAWINGS

FIG. 6 is a diagram illustrating an example of essence mark data;

FIG. 8 is a diagram illustrating an example of editing result EM data generated upon performing the Assemble Edit in FIG. 7;

FIG. 10 is a diagram illustrating an example of editing result EM data generated upon performing the Assemble Edit in FIG. 9;

FIG. 12 is a diagram illustrating an example of editing result EM data generated upon performing the Insert Edit in FIG. 11;

FIG. 14 is a diagram illustrating an example of editing result EM data generated upon performing the Insert Edit in FIG. 13;

FIG. 18 is a diagram illustrating an example of editing description data;

FIG. 19 is a diagram illustrating an example of editing result EM data generated upon performing the Assemble Edit in FIG. 17;

FIG. 23 is a diagram illustrating an example of editing result EM data generated upon performing the Insert Edit in FIG. 22.

DESCRIPTION OF THE PREFERRED EMBODIMENTS

Specific embodiments to which the present invention has been applied will be described in detail with reference to the drawings.

Figure 1A:
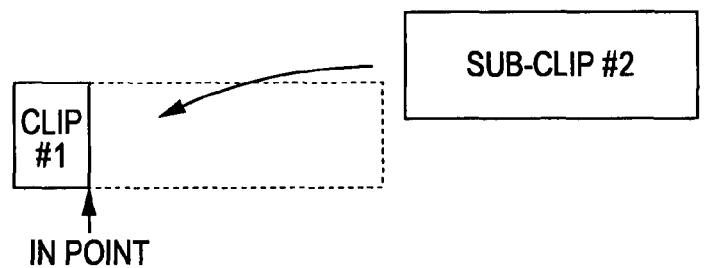
FIGS. 1A through 1C are diagrams illustrating examples of linear editing.
Figure 1B:
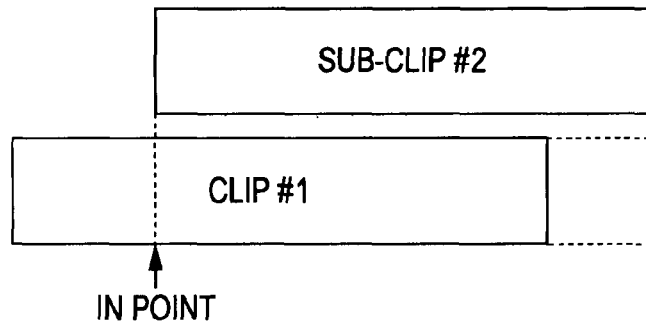
Figure 1C:
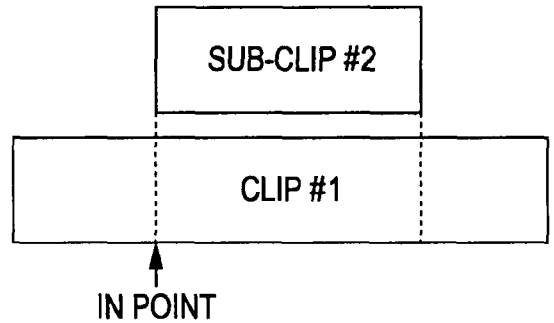
Figure 2:
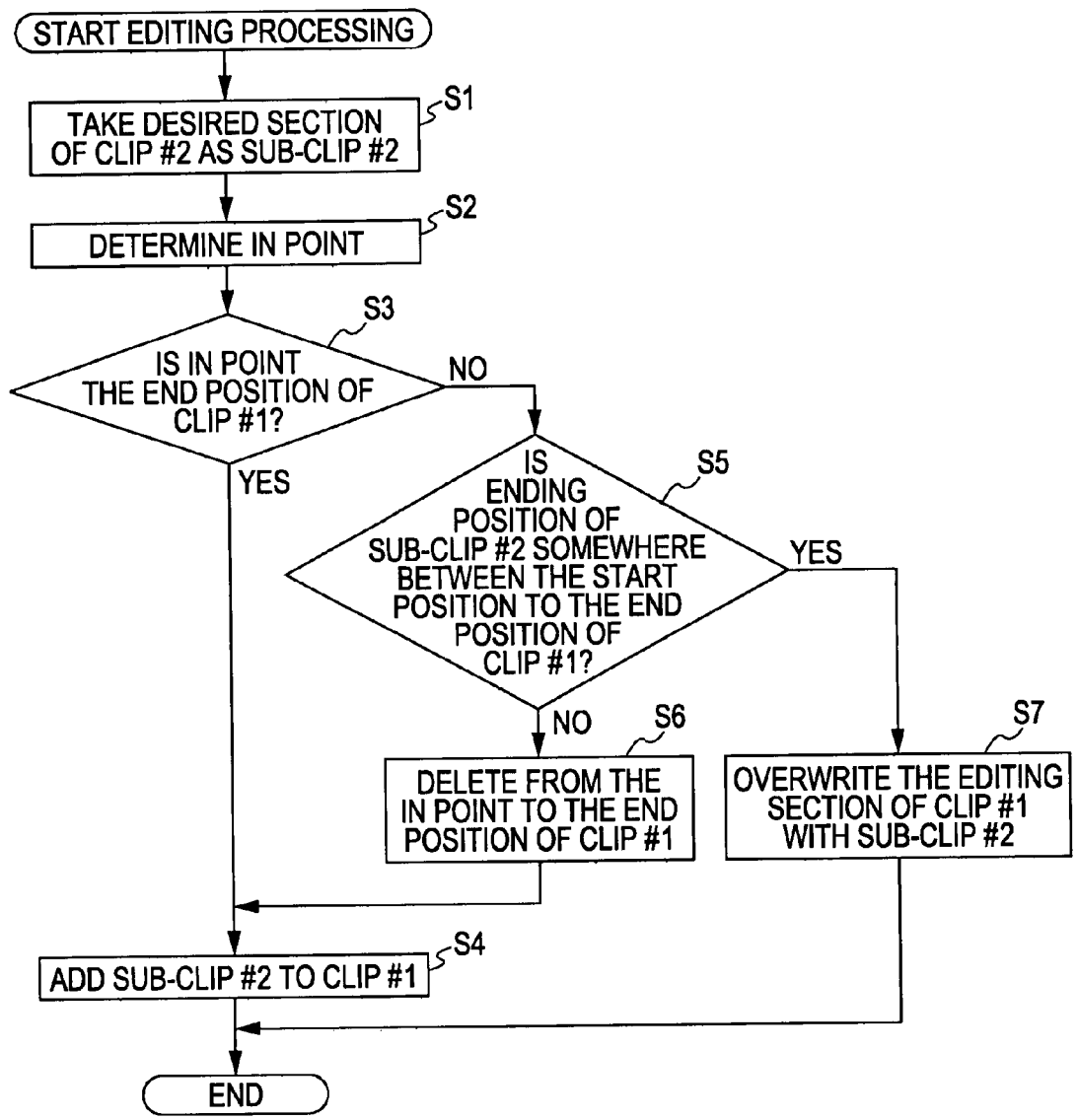
FIG. 2 is a diagram illustrating an example of known editing processing.
Figure 3:
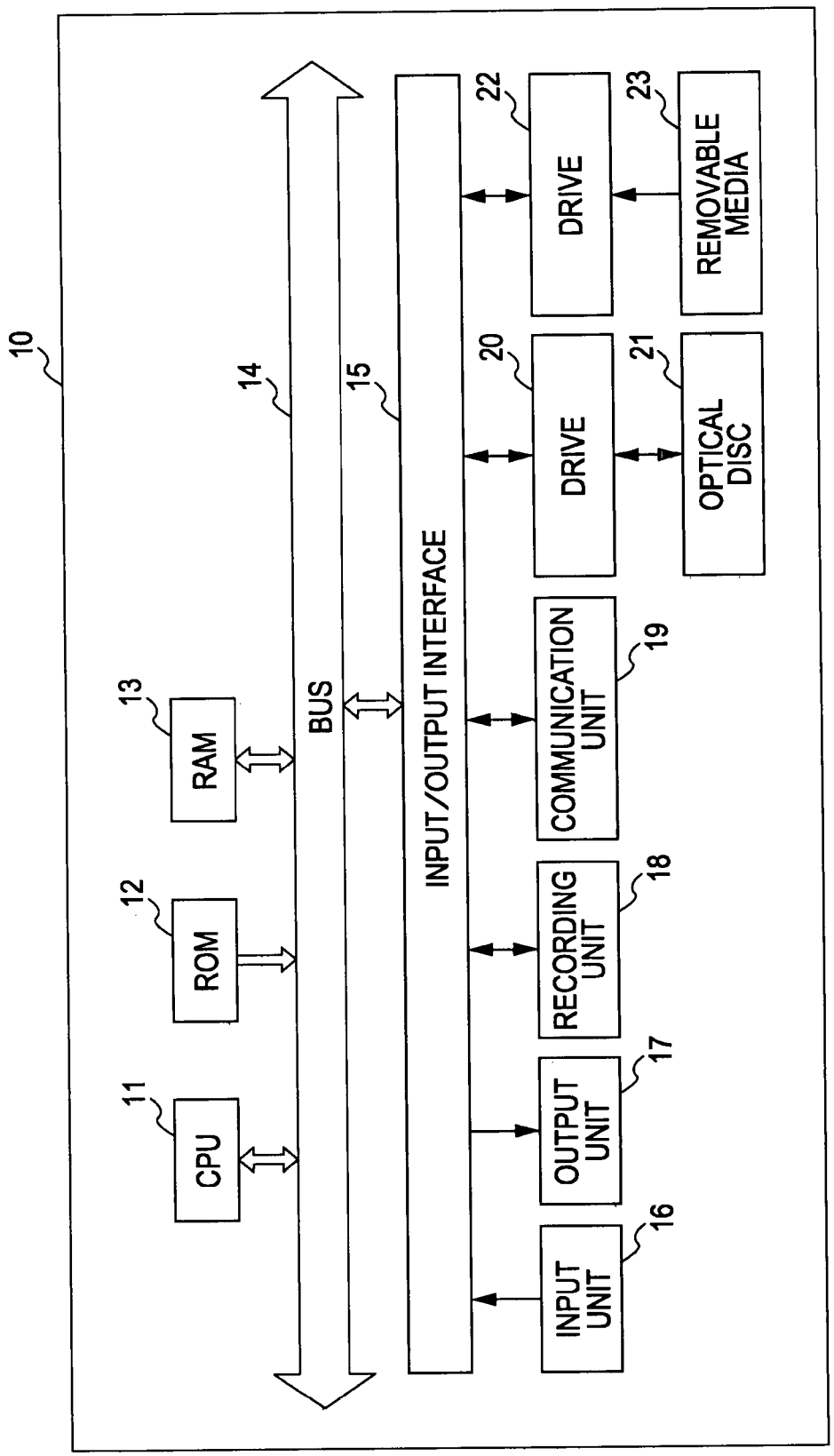
FIG. 3 is a diagram illustrating a hardware configuration example of an editing apparatus to which the present invention has been applied.

FIG. 3 is a block diagram illustrating a configuration example of hardware of an editing apparatus 10 to which the present invention has been applied. A CPU (Central Processing Unit) 11 executes various types of processing according to programs stored in ROM (Read Only Memory) 12 or a recording unit 18. for example, the CPU 11 performs editing on clips recorded in an optical disc 21.

RAM (Random Access Memory) 13 stores programs to be executed by the CPU 11, data, and so forth, as suitable. The CPU 11, ROM 12, and RAM 13 are connected one with another by a bus 14.

Also connected to the CPU 11 is an input/output interface 15, via the bus 14. Connected to the input/output interface 15 are an input unit 16 made up of a keyboard, mouse, microphone, reception unit for receiving command transmitted from an unshown memory controller, and so forth, and an output unit 17 made up of a display speaker, and so forth. The CPU 11 executes various types of processing in response to commands input from the input unit 16. The CPU 11 then outputs the results of processing to the output unit 17.

The recording unit 18 connected to the input/output interface 15 is configured of a hard disk for example, and records programs to be executed by the CPU 11, and various types of data. The programs may be stored beforehand, or may be obtained via a communication unit 19 and recorded in the recording unit 18.

Also, the communication unit 19 connected to the input/output interface 15 communicates with external devices, via network such as the Internet, a Local Area Network, or the like. For example, the communication unit 19 receives clips obtained as the result of an external device shooting video. The received clips are recorded on an optical disc 21 by a drive 20.

Further, the drive 20 connected to the input/output interface 15 drives discs mounted thereto, so as to record clips therein, or obtain clips recorded therein. The obtained clips are output to, for example, the output unit 17.

A drive 22 connected to the input/output interface 15 drives removable media 23 such as magnetic disks, optical discs, magento-optical disks, semiconductor memory, or the like, mounted thereto, and obtains programs or data recorded therein. The obtained programs and data are transferred to the recording unit 18 as necessary, and recorded.

Next, with the editing apparatus 10 shown in FIG. 3, the CPU 11 functions as an editing processing unit for editing clips, by executing a predetermined program.

Figure 4:
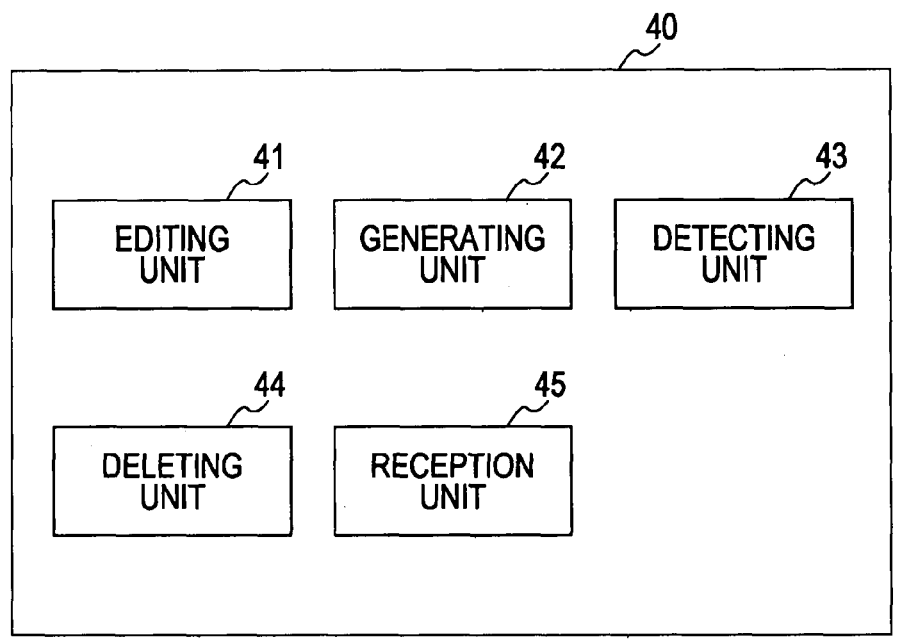
FIG. 4 is a diagram illustrating a configuration example of the editing apparatus.

FIG. 4 illustrates a functional configuration example of such an editing processing unit.

The editing processing unit 40 is configured of an editing unit 41, generating unit 42, detecting unit 43, deleting unit 44, and reception unit 45, and performs linear editing (destructive editing).

The editing unit 41 subjects clips recorded in the optical disc 21 to Assemble Edit or Insert Edit of sub-clips of new clips, in response to control signals corresponding to commands input from the input unit 16 shown in FIG. 3 and supplied from the reception unit 45.

Clips corresponding to the sub-clips to be edited are received from the video shooting device via the communication unit 19, for example. Note that in the vent that the editing device 10 has a video shooting unit for shooting video, an arrangement may be made wherein data of a predetermined section of a clip obtained as the result of shooting video with the video shooting unit is taken as a sub-clip.

The generating unit 42 takes an essence mark (electronic mark) indicating the characteristics of video of a clip to be edited that is recorded in the optical disc 21 (such a clip will hereafter be referred to as "clip to be edited" as appropriate, and such an essence mark will hereafter be referred to as "editing clip EM" as appropriate), and in response of control signals supplied from the reception unit 45, assigns the editing clip EM, without change, to the editing result clip, as an essence mark (electronic mark) indicating the characteristics of video of a clip obtained as the result of editing (such a clip will hereafter be referred to as "editing result clip" as appropriate, and such an essence mark will hereafter be referred to as "editing result EM" or "edited video electronic mark" as appropriate).

Also, the generating unit 42 takes an essence mark indicating the characteristics of video of a sub-clip to be edited (hereafter be referred to as "sub-clip EM" as appropriate), and in response of control signals supplied from the reception unit 45, assigns this to an editing result clip as an editing result EM. Further, the generating unit 42 newly generates an essence mark indicating at least one of the start position and end position of an editing section as the characteristics of the edited vide (hereafter referred to as "cut point EM" or "section electronic mark"), and in response of control signals supplied from the reception unit 45, assigns this to the editing result clip as an editing result EM.

Further, based on control signals corresponding to operations at the input unit 16 performed by the user to specify a desired position for a clip or sub-clip to be edited and characteristics of the video at that position, received from the reception unit 45, the generating unit 42 newly generates an essence mark which is assigned to the predetermined position and indicates the characteristics of the video at that position (hereafter referred to as "desired position EM"), and assigns this to the editing result clip as an editing result EM. Also, the generating unit 42 generates essence mark data describing an editing result EM (hereafter referred to as "editing result EM data") and records this in correlation with the editing result clip.

The detecting unit 43 detects, of editing clip EMs other than an editing clip EM indicating the start position of the clip to be edited, and an editing clip EM indicating the characteristics of video as to the editing section, as an invalid EM which will become invalid following editing, in response of control signals supplied from the reception unit 45. The detecting unit 43 supplies information for identifying the detected invalid EM to the deleting unit 44.

The deleting unit 44 deletes the description of invalid EMs from the editing result EM data generated by the generating unit 42, based on the information for identifying invalid EMs that is supplied from the detecting unit 43.

The reception unit 45 receives commands input from the input unit 16, and supplies control signals corresponding to the commands to the editing unit 41, generating unit 42, and detecting unit 43.

Next, essence marks will be described with reference to FIG. 5.

Figure 5:
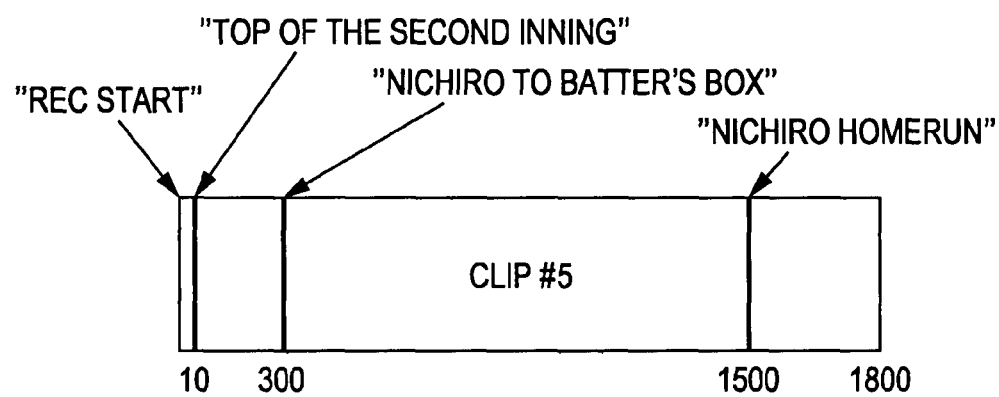
FIG. 5 is a diagram for describing essence marks.

Let us say that in FIG. 5, clip #5 is a clip of 1,800 frames (one minute) obtained by shooting a scene of a baseball game where Nichiro is playing as a player, and hits a homerun.

In the example in FIG. 5, first, at the time of starting shooting of clip #5, a first essence mark indicating "REC start (start position)" is assigned to the 0'th frame as the characteristic thereof, which is the start position of the clip #5.

Next, ⅓ seconds after shooting of the clip #5 starts which is when shooting starts of the video of the second inning of the baseball game starting, operating the input unit 16 to instruct assigning of a second essence mark indicating "top of the second inning" as the characteristic of the video causes the second essence mark indicating "top of the second inning" as the characteristic thereof to be assigned to the 10'th frame of the clip #5.

Next, 10 seconds after shooting of the clip #5 starts which is when the video of Nichiro entering the batter's box is short, operating the input unit 16 to instruct assigning of an essence mark indicating "Nichiro to batter's box" as the characteristic of the video causes a third essence mark indicating "Nichiro to batter's box" as the characteristic thereof to be assigned to the 300'th frame of the clip #5.

Next, 50 seconds after shooting of the clip #5 starts which is when the video of Nichiro hitting a homerun is short, operating the input unit 16 to instruct assigning of an essence mark indicating "Nichiro homerun" as the characteristic of the video causes a fourth essence mark indicating "Nichiro homerun" as the characteristic thereof to be assigned to the 1500'th frame of the clip #5.

Thus, four essence marks are assigned to the clip #5 shown in FIG. 5. Note that with the example in FIG. 5, the user assigns essence marks, but an arrangement may be made wherein the user causes the clip #5 to be displayed on the output unit 17 following shooting of the clip #5, and command assigning of essence marks at desired timings while watching this clip #5.

FIG. 6 illustrates an example of essence mark data describing the essence marks in FIG. 5.

Note that the essence mark data in the example in FIG. 6 is described in XML (eXtensible Markup Language). Also, the numerals at the beginning of each line in FIG. 6 have been added only for the purpose of explanation to be made here, and are not part of the XML description. The same holds true for the later-described FIGS. 8, 10, 12, 14, and 19 as well.

As shown in FIG. 6, the XML description of essence mark data is primarily configured of an essence mark table portion defined by essence mark table tags (<EssenceMarkTable></EssenceMarkTable>). In the example shown in FIG. 6, this essence mark table is described in lines 1 through 6.

In line 1, targetEssence="Clip5" indicates that the essence mark data is essence mark data describing an essence mark to be assigned to the clip #5. While the expression "Clip5" is used here in this example, in reality, a UMID assigned to clip #5 will be described here.

Specifically, the essence mark table portion includes a list of information of all essence marks assigned to the clip #5. In the example in FIG. 6, the EssenceMark element corresponds to each essence mark, with the value attribute identifying the characteristic indicated by the essence mark, and the frameCount attribute indicating the position where the essence mark is assigned, in terms of how many frames from the start of the clip.

For example, the description
EssenceMark value="RECstart" frameCount="0"/
at Line 2 in FIG. 6 indicates that the characteristic of the essence mark is the REC start (start position), and that the assigned position thereof is the 0'th frame from the start of the clip #5. That is to say, the description in Line 2 indicates the first essence mark in FIG. 5.

In the same way, the description
EssenceMark value="top of the second inning" frameCount="10"/
at Line 3 indicates the second essence mark, the description
EssenceMark value="Nichiro to batter's box" frameCount="300"/
at Line 4 indicates the third essence mark, and the description
EssenceMark value="Nichiro homerun" frameCount="1500"/
at Line 5 indicates the fourth essence mark.

Thus, the essence mark data in FIG. 6 describes the first through fourth essence marks assigned to the clip #5. Note that this essence mark data may be received from the video shooting device, and/or recorded in the optical disc 21, in a manner correlated with the clip #5.

Next, editing performed by the editing unit 41 shown in FIG. 4, and the editing result EM data generated by the generating unit 42 in conjunction therewith will be described with reference to FIGS. 7 through 14.

FIGS. 7 through 10 are diagram describing Assemble Edit performed by the editing unit 41, and editing result EM data generated by the generating unit 42 in conjunction therewith.

Figure 7:
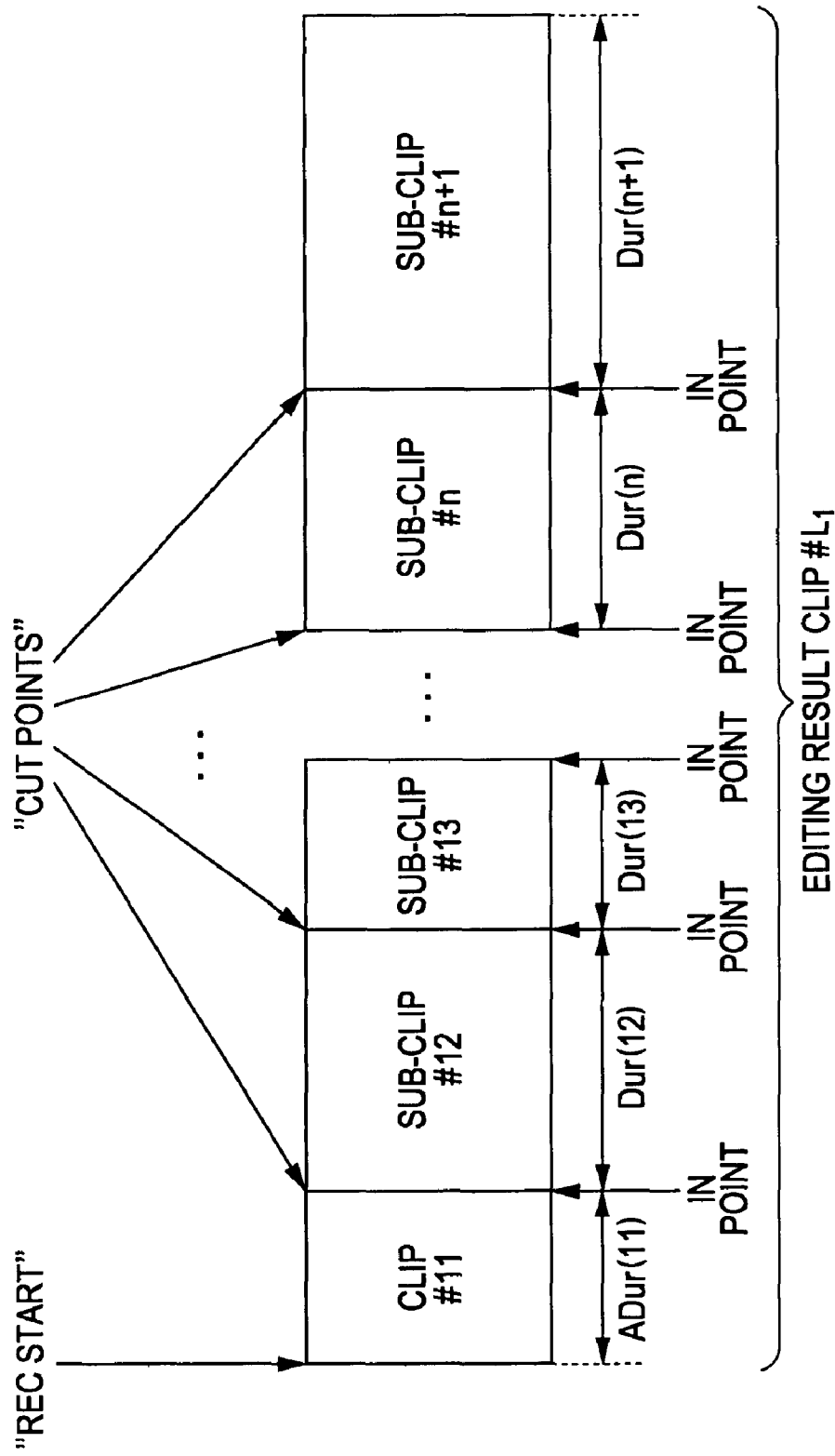
FIG. 7 is a diagram for describing Assemble Edit.

Note that in the example in FIG. 7, the clip #11 has an editing clip EM indicating "REC Start" as the characteristic assigned to the 0'th frame, while no sub-clip EMs are assigned to sub-clip #12 through sub-clip #n+1.

In the example in FIG. 7, first, a section to be taken as the sub-clip #12 is specified from the clip #12 by operating the input unit 19, and a command is given to specify the end point of a clip #1 of ADur(11) frame that has already been recorded in the optical disc 21, as an in point.

The editing unit 41 performs Assemble Edit wherein the sub-clip #12 of the Dur(12) frame is added to the clip #11 of the ADur(11) frame, and the data obtained as the result thereof is taken as a single editing result clip having a continuous time code, in response to control signals corresponding to the command.

At this time, as shown in FIG. 7, the generating unit 42 assigns an editing clip EM indicating "REC Start" to the 0'th frame of the editing results clip with no change, as an editing result EM. Also, the generating unit 42 newly generates a cut point EM indicating the start position of the editing section, and assigns this to the ADur(11)'th frame of the editing result clip, which is the start position of the editing section specified by the user as an in point, as an editing result EM.

Now, ADur(i) represents the number of frames of a clip #i, and Dur(i) represents the number of frames of a sub-clip #i.

Next, the user specifies a section to be taken as a sub-clip #13 from the clip #13, and takes the editing result clip obtained by the previous Assemble Edit recorded in the optical disc 21, i.e., the editing result clip obtained as the result of the sub-clip #12 having been added to the clip #11, as a clip to be edited, an further gives a command to specify the end position of the clip to be edited, as an in point. The editing unit 41 performs Assemble Edit wherein the sub-clip #13 is added to the editing result clip obtained by the previous Assemble Edit, in response to control signals corresponding to that command, and takes the data obtained as the result thereof as a single editing result clip.

At this time, as shown in FIG. 7, the generating unit 42 newly generates a cut point EM indicating the start position of the editing section, and assigns this to the ADur(11)+Dur(12) 'th frame which is the start position of the editing section, specified by the user as an in point.

Subsequently, in the same way, the user gives a command to specify a section to be taken as sub-clips from clip #14 through clip #n+1, and takes the end position of the editing result clip obtained by the previous Assemble Edit as an in point. The editing unit 41 thus performs Assemble Edit for clip #14 through clip #n+1 in order, and the data obtained as the result thereof is taken as an editing result clip #$L_1$.

Also, along with this Assemble Edit, cut point EMs indicating the start position of editing sections are assigned in order to the start positions of the editing sections specified by the user as in points of the editing result clip, as editing result EMs.

FIG. 8 shows editing result EM data describing the editing result EM assigned to the editing result clip $L_1$ as described above.

In line 1 in FIG. 8, targetEssence="ClipL$_1$" is described, this description indicating that the editing result EM data is editing result EM data describing editing result EMs to be assigned to the editing result clip #$L_1$.

Also, the description
EssenceMark value="RECstart" frameCount="0"/
at Line 2 in FIG. 8 indicates that the characteristic of the editing result EM is the REC start (start position), and that the assigned position thereof is the 0'th frame of the editing result clip #$L_1$.

Also, the description
EssenceMark value="cut point" frameCount="ADur(11)"/
at Line 3 in FIG. 8 indicates that the characteristic of the editing result EM is a "cut point", and that the assigned position thereof is the ADur(11)'th frame from the start, i.e., the start position of the editing section specified by the user as the in point at the time of performing Assemble Edit of the sub-clip #12.

Also, the description
EssenceMark value="cut point" frameCount="ADur(11)+Dur(12)"/
at Line 4 in FIG. 8 indicates that the characteristic of the editing result EM is a "cut point", and that the assigned position thereof is the ADur(11)+Dur(12)'th frame from the start, i.e., the start position of the editing section specified by the user as the in point at the time of performing Assemble Edit of the sub-clip #13.

Subsequently, cut point EMs are described in the same way as editing result EMs, and finally, the description
EssenceMark value="cut point" frameCount="ADur(11)+Dur(12)+ . . . +Dur(n)"/
at Line 5 in FIG. 8 indicates that the characteristic of the editing result EM is a "cut point", and that the assigned position thereof is the ADur(11)+Dur(12)+ . . . +Dur(n)'th frame from the start, i.e., the start position of the editing section specified by the user as the in point at the time of performing Assemble Edit of the sub-clip #n+1.

While FIGS. 7 and 8 have been described with an example wherein no sub-clip EMs are assigned to the sub-clips #12 through n+1 to be edited, there are cases that sub-clip EMs are assigned to the sub-clips to be edited. An example of such a case will be described with reference to FIGS. 9 and 10.

Figure 9:
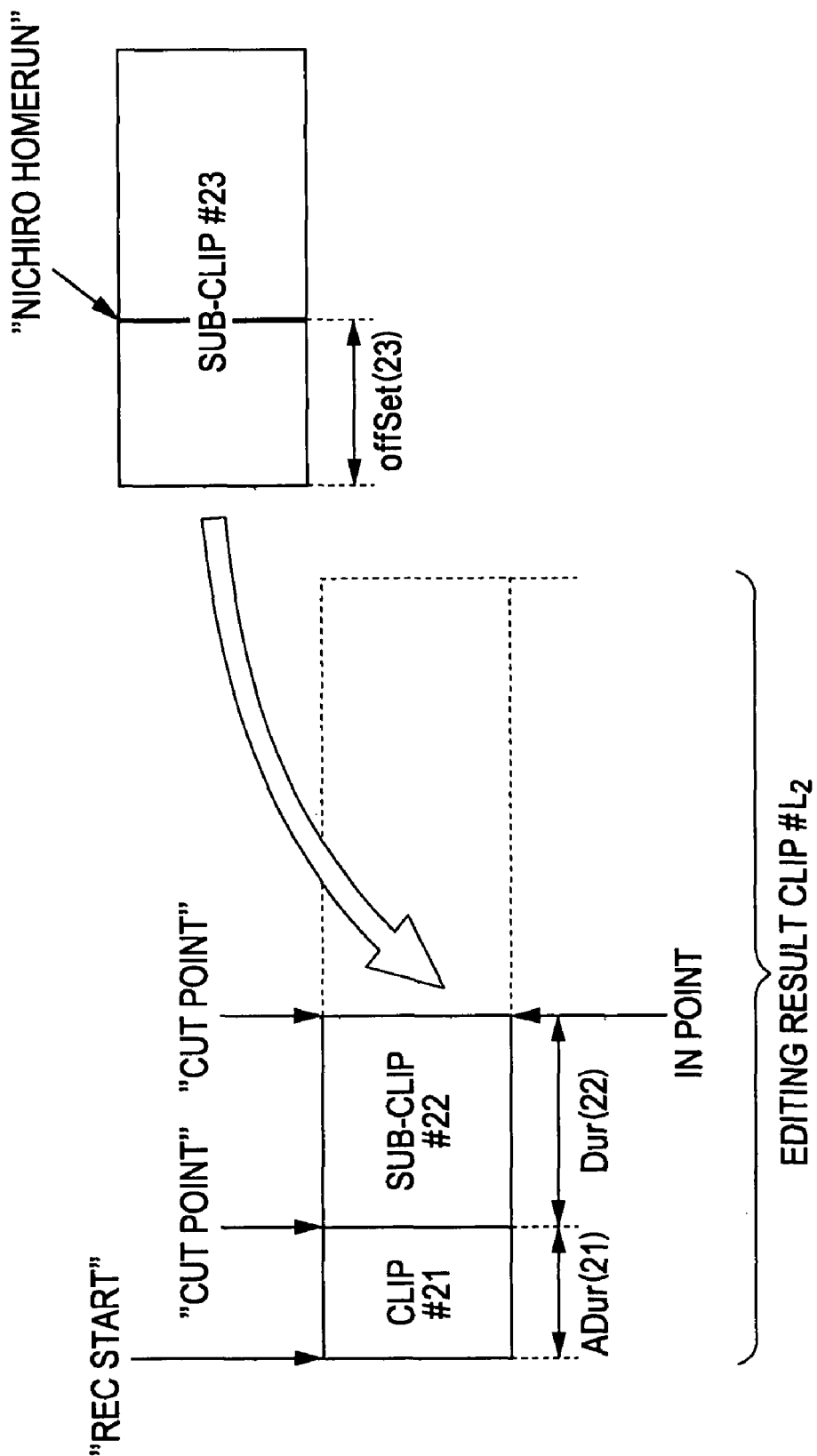
FIG. 9 is a diagram for describing other Assemble Edit.

That is to say, with the example in FIG. 9, a clip #23 corresponding to a sub-clip #23 to be edited is a clip obtained as a result of shooting a scene of a baseball game where Nichiro is playing as a player, and hits a homerun. A sub-clip EM indicating "Nichiro homerun" as the characteristic is assigned at the offset(23)'th frame from the start of the sub-clip #23 within the sub-clip #23 section of the clip #23. Note that the clip #21 is assigned with an editing clip EM indicating "REC Start" as a characteristic at the 0'th frame beforehand.

In the example in FIG. 9, the user first operates the input unit 19 to specify the sub-clip #22 of the clip #22 as a section, and gives a command for specifying the end point of the clip #21 of ADur(21) frames, already recorded in the optical disc 21, as an in point.

The editing unit 41 performs Assemble Edit wherein the sub-clip #22 of Dur(22) frames is added to the clip #21 of ADur(21) frames, in response to control signals corresponding to that command, and takes the data obtained as the result thereof as a single editing result clip.

At this time, as shown in FIG. 9, the generating unit 42 assigns an editing clip EM indicating "REC Start" to the 0'th frame of the editing results clip with no change, as an editing result EM. Also, the generating unit 42 newly generates a cut point EM indicating the start position of the editing section, and assigns this to the ADur(21)'th frame which is the start position of the editing section, specified by the user as an in point.

Next, the user specifies a section to be taken as a sub-clip #23 from the clip #23, and gives a command to specify the end position of the editing result clip obtained by the previous Assemble Edit recorded in the optical disc 21, i.e., the editing result clip obtained as the result of the sub-clip #22 having been added to the clip #21, as an in point. The editing unit 41 performs Assemble Edit wherein the sub-clip #23 is added to the editing result clip obtained by the previous Assemble Edit, in response to control signals corresponding to that command, and takes the data obtained as the result thereof as a single editing result clip $L_2$.

At this time, as shown in FIG. 9, the generating unit 42 newly generates a cut point EM indicating the start position of the editing section, and assigns this to the ADur(21)+Dur(22)'th frame of the editing result clip #$L_2$, which is the start position of the editing section, specified by the user as an in point, as an editing result EM. Also, the generating unit 42 assigns a sub-clip EM indicating "Nichiro homerun" which is assigned to a corresponding position on the editing result clip #$L_2$, i.e., is assigned to the editing result clip #$L_2$ at the position of the offset(23)'th frame from the ADur(21)+Dur(22)'th frame from the start of the clip #$L_2$ which is the start position of the sub-clip #23, as an editing result EM.

Thus, in the event that a sub-clip EM has already been assigned to the sub-clip #23 which is to be subjected to Assemble Edit, the generating unit 42 assigns that sub-clip EM as an editing result EM at the position of the editing result clip #$L_2$ corresponding to the position in the sub-clip #23 to which it was assigned. Thus, the sub-clip EM already assigned to the sub-clip #23 which is the object of Assemble Edit can be succeeded to the editing result clip #$L_2$ obtained as a result of editing thereof. Consequently, consistency of essence marks can be ensured before and after Assemble Edit.

FIG. 10 shows editing result EM data describing the editing result EM assigned to the editing result clip $L_2$ as described above.

In line 1 in FIG. 10, targetEssence="Clip$L_2$" is described, this description indicating that the editing result EM data is editing result EM data describing editing result EMs to be assigned to the editing result clip #$L_2$.

Also, the description
EssenceMark value="RECstart" frameCount="0"/
at Line 2 in FIG. 10 indicates that the characteristic of the editing result EM is the REC start, and that the assigned position thereof is the 0'th frame from the start of the editing result clip #$L_2$.

Further, the description
EssenceMark value="cut point" frameCount="ADur(21)"/
at Line 3 in FIG. 10 indicates that the characteristic of the editing result EM is a "cut point", and that the assigned position thereof is the ADur(21)'th frame from the start, i.e., the start position of the editing section specified by the user as the in point at the time of performing Assemble Edit of the sub-clip #22.

In the same way, the description
EssenceMark value="cut point" frameCount="ADur(21)+Dur(22)"/
at Line 4 in FIG. 10 indicates that the characteristic of the editing result EM is a "cut point", and that the assigned position thereof is the ADur(21)+Dur(22)'th frame from the start, i.e., the start position of the editing section specified by the user as the in point at the time of performing Assemble Edit of the sub-clip #23.

The description
EssenceMark value="Nichiro homerun" frameCount="ADur(21)+Dur(22)+offset(23)"/
at Line 5 in FIG. 10 indicates that the characteristic of the editing result EM is "Nichiro homerun", and that the assigned position thereof is the ADur(21)+Dur(22)+offset(23)'th frame from the start, i.e., the offset(23)'th frame from start position sub-clip #23 on the editing result clip #$L_2$.

FIGS. 11 through 14 are diagrams for describing Insert Edit by the editing unit 41, and editing result EM data generated by the generating unit 42 in conjunction therewith.

Figure 11:
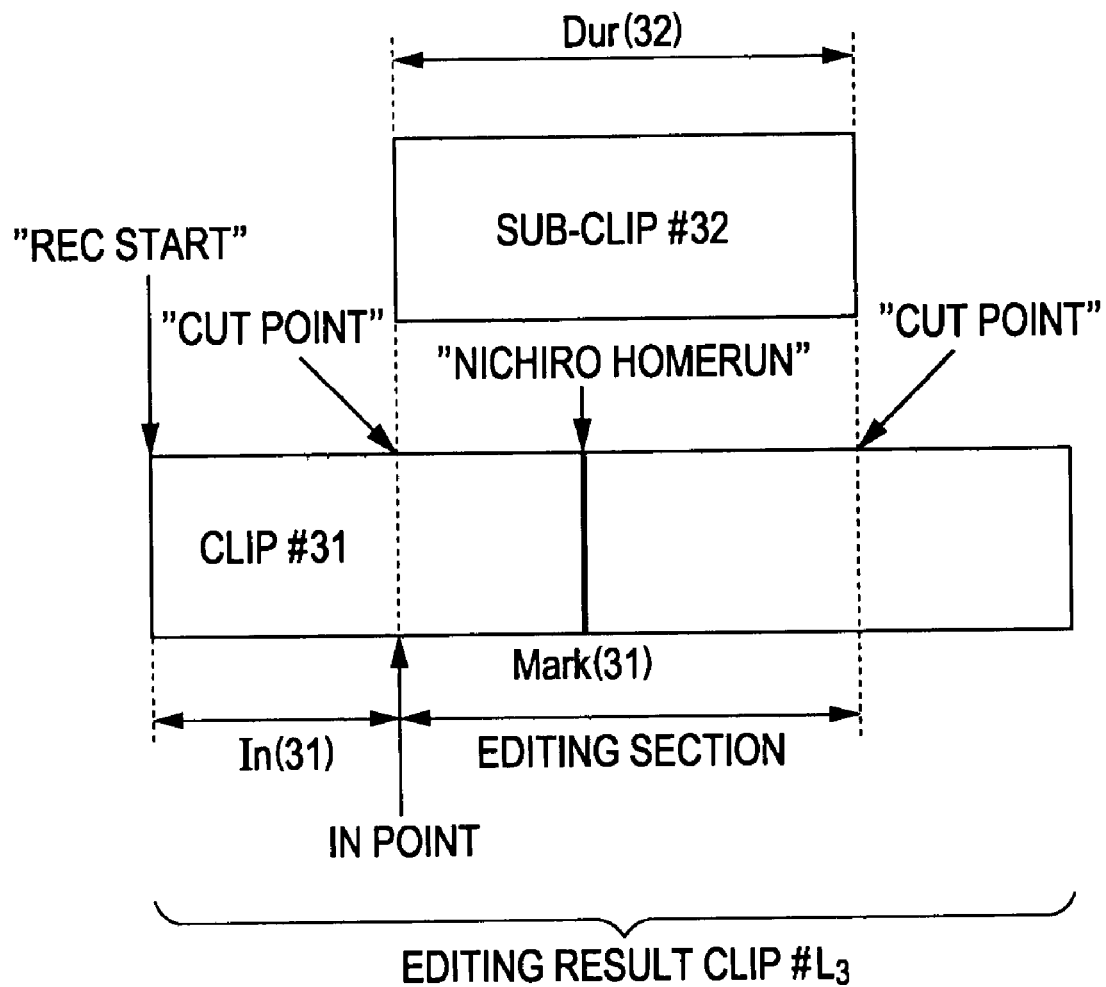
FIG. 11 is a diagram for describing Insert Edit.

Note that in the example in FIG. 11, the clip #31 is a clip obtained as a result of shooting a scene of a baseball game where Nichiro is playing as a player, and hits a homerun. Let us say that the clip #31 has an editing clip EM indicating "REC Start" as the characteristic assigned to the 0'th frame, and an editing clip indicating "Nichiro homerun" assigned beforehand to the Mark(31)'th frame which is a position within the editing section, while no sub-clip EM is assigned to the sub-clip #32.

In the example in FIG. 11, first, a section to be taken as the sub-clip #32 is specified from the clip #32 by the user operating the input unit 19, and a command is given to specify the Position of the In(31)'th frame of the clip #31, that has already been recorded in the optical disc 21, as an in point. In response to control signals corresponding to the command, the editing unit 41 performs Insert Edit for inserting the sub-clip #32 configured of Dur(32) frames to the clip #31, and takes the data obtained as a result thereof as a single editing result clip $L_3$.

At this time, as shown in FIG. 11, the generating unit 42 assigns the editing clip EMs indicating "REC Start" and "Nichiro homerun" without change to the editing result clip #$L_3$, as editing result EMs. Also, the generating unit 42 newly generates a cut point EM indicating the start position of the editing section, and assigns the cut point EM to the In(31)'th frame which is the start position of the editing section, specified by the user as an in point.

Also, the generating unit 42 newly generates a cut point EM indicating the end position of the editing section, and assigns the cut point EM to the end position of the editing section which is a position on the editing result clip #$L_3$ following the in point by a duration equivalent to the length of the sub-clip #32, i.e., the position of the In(31)+Dur(32)'th frame from the in point, as an editing result EM. The generating unit 42 generates editing result EM data describing the editing result EMs assigned to the editing result clip $L_3$.

Also, the detecting unit 43 detects, of the editing clips EM other than the editing clip EM indicating "REC Start" which is the start position of the clip to be edited, the editing clip EM indicating "Nichiro-homerun" assigned to the Mark(31)'th frame, which is an editing clip indicating the characteristic of the video corresponding to the editing section, as an invalid EM which will be come invalid following editing. The deleting unit 44 deletes the description of the invalid EM from the editing result EM data generated by the generating unit 42.

Thus, the deleting unit takes an editing clip EM positioned within an editing section which is to be overwritten by the sub-clip #32 as an invalid EM and deletes the description of the invalid EM from the editing result EM data, so consistency of essence marks can be completely ensured before and after Insert Edit.

FIG. 12 shows the editing result EM data following description of the invalid EM having been deleted as described above.

In line 1 in FIG. 12, targetEssence="ClipL$_3$" is described, this description indicating that the editing result EM data is editing result EM data describing editing result EMs to be assigned to the editing result clip #L$_3$.

Also, the description
EssenceMark value="RECstart" frameCount="0"/
at Line 2 in FIG. 12 indicates that the characteristic of the editing result EM is "REC Start", and that the assigned position thereof is the 0'th frame from the start of the editing result clip #L$_3$.

Further, the description
EssenceMark value="cut point" frameCount="In(31)"/
at Line 3 in FIG. 12 indicates that the characteristic of the editing result EM is a "cut point", and that the assigned position thereof is the In(31)'th frame from the start, i.e., the start position of the editing section specified by the user as the in point at the time of performing Insert Edit of the sub-clip #32.

In the same way, the description
EssenceMark value="cut point" frameCount="In(31)+Dur(32)"/
at Line 4 in FIG. 12 indicates that the characteristic of the editing result EM is a "cut point", and that the assigned position thereof is the In(31)+Dur(32)'th frame from the start, i.e., the end position of the editing section.

While description has been made regarding a case wherein no sub-clip EM is assigned to the sub-clip #32 to be edited in the above-described FIGS. 11 and 12, there are cases that sub-clip EMs are assigned to the sub-clips to be edited. An example of such a case will be described with reference to FIGS. 13 and 14.

Figure 13:
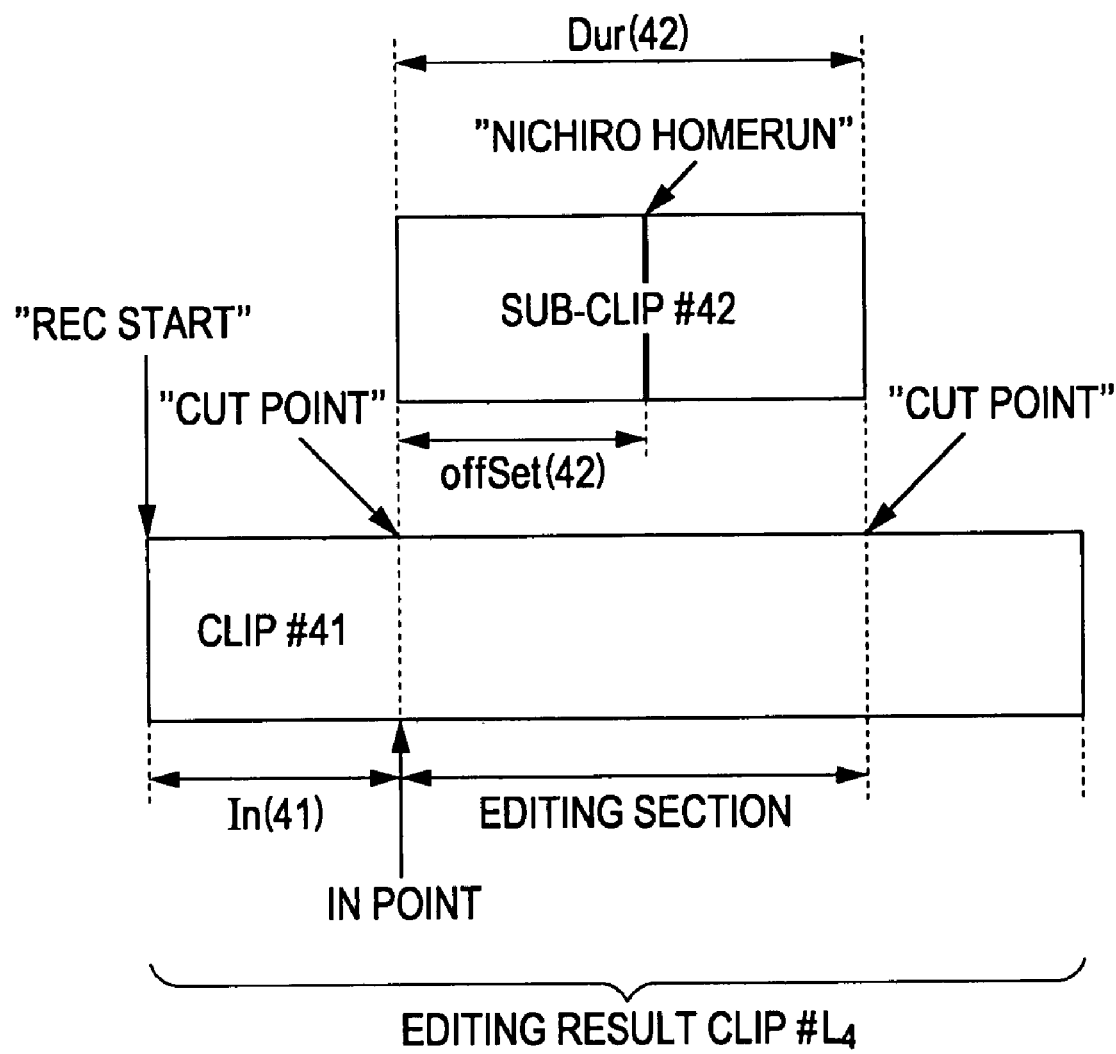
FIG. 13 is a diagram for describing other Insert Edit.

That is to say, with the example in FIG. 13, a clip #42 corresponding to a sub-clip #42 to be edited is a clip obtained as a result of shooting a scene of a baseball game where Nichiro is playing as a player, and hits a homerun. A sub-clip EM indicating "Nichiro homerun" as the characteristic is assigned at the offset(42)'th frame from the start of the sub-clip #42 within the sub-clip #42 section of the clip #42. Note that the clip #41 is assigned with an editing clip EM indicating "REC Start" as a characteristic at the 0'th frame beforehand.

In the example in FIG. 13, the user first operates the input unit 19 to specify the sub-clip #42 of the clip #42 as a section, and gives a command for specifying the position of the In(41)'th frame of the clip #41, already recorded in the optical disc 21, as an in point. The editing unit 41 performs Insert Edit wherein the sub-clip #42 of Dur(42) frames is inserted into the clip #41, in response to control signals corresponding to that command, and takes the data obtained as the result thereof as a single editing result clip #L$_4$.

At this time, as shown in FIG. 13, the generating unit 42 assigns an editing clip EM indicating "REC Start" to the 0'th frame of the editing results clip with no change, as an editing result EM. Also, the generating unit 42 newly generates a cut point EM indicating the start position of the editing section, and assigns this as an editing result clip to the In(41)'th frame which is the start position of the editing section of the editing result clip #L$_4$, specified by the user as an in point.

Also, the generating unit 42 newly generates a cut point EM indicating the end position of the editing section, and assigns the cut point EM to the end position of the editing section which is a position on the editing result clip #L$_4$ following the in point by a duration equivalent to the length of the sub-clip #42, i.e., the position of the In(41)+Dur(42)'th frame from the in point, as an editing result EM.

Also, the generating unit 42 assigns a sub-clip EM indicating "Nichiro homerun", which is assigned to the offset(42)'th frame of the sub-clip #42, to a corresponding position on the editing result clip #L$_4$, i.e., to the editing result clip #L$_4$ at the position of the offset(42)'th frame from the In(41)'th frame from the start of the clip #L$_4$ which is the start position of the sub-clip #42, as an editing result EM.

Thus, in the event that a sub-clip EM has already been assigned to the sub-clip #42 which is to be subjected to Insert Edit, the generating unit 42 assigns that sub-clip EM as an editing result EM at the position of the editing result clip #L$_4$ corresponding to the position in the clip #423 to which it was assigned, in the same way as with Assemble Edit. Thus, the sub-clip EM already assigned to the sub-clip #42 which is the object of Insert Edit can be succeeded to the editing result clip #L$_4$ obtained as a result of editing thereof.

FIG. 14 shows editing result EM data describing the editing result EM assigned to the editing result clip L$_4$ as described above.

In line 1 in FIG. 14, targetEssence="ClipL$_4$" is described, this description indicating that the editing result EM data is editing result EM data describing editing result EMs to be assigned to the editing result clip #L$_4$.

Also, the description
EssenceMark value="RECstart" frameCount="0"/
at Line 2 in FIG. 14 indicates that the characteristic of the editing result EM is the REC start, and that the assigned position thereof is the 0'th frame of the editing result clip #L$_4$.

Further, the description
EssenceMark value="cut point" frameCount="In(41)"/
at Line 3 in FIG. 14 indicates that the characteristic of the editing result EM is a "cut point", and that the assigned position thereof is the In(41)'th frame from the start, i.e., the start position of the editing section specified by the user as the in point at the time of performing Insert Edit of the sub-clip #42.

Also, the description
EssenceMark value="Nichiro homerun" frameCount="In(41)+offset(42)"/
at Line 4 in FIG. 14 indicates that the characteristic of the editing result EM is "Nichiro homerun", and that the assigned position thereof is the In(41)+offset(42)'th frame from the start, i.e., the offset(42)'th frame from the start position sub-clip #42 on the editing result clip #L$_4$.

Further, the description
EssenceMark value="cut point" frameCount="In(41)+Dur(42)"/
at Line 5 in FIG. 14 indicates that the characteristic of the editing result EM is a "cut point", and that the assigned position thereof is the In(41)+Dur(42)'th frame from the start, i.e., the end position of the editing section.

Next, editing processing at the time of the editing processing unit 40 shown in FIG. 4 performing Assemble Edit or Insert Edit on a clip will be described with reference to FIG. 5. This editing processing is started when a user specifies a clip to be edited, for example.

In step S31, the editing unit 41 takes data of a desired section of a desired clip as a sub-clip, in response to control signals corresponding to commands input by a user at the input unit 16, which are supplied from the reception unit 45. Note that in the event that the user operates the input unit 16 but does not input information relating to a desired section, the desired clip itself is taken as the sub-clip.

Following the processing in step S31, the flow proceeds to step S32, where the generating unit 42 generates essence mark data of sub-clip EMs (hereafter referred to "sub-clip EM data"), based on the essence mark data in the clip corresponding to the sub-clip.

For example, in the event of performing the Assemble Edit shown in FIG. 9, the generating unit 42 takes, of the essence marks described in the essence mark data of the clip #23, the essence mark indicating "Nichiro homerun" which is assigned to a position within the sub-clip #23, as a sub-clip EM. Note that in the essence mark data of the clip #23, the position to which the essence mark indicating "Nichiro homerun" is assigned is represented in terms of the number of frames from the start of the clip #23, so the generating unit 42 changes the position to which the sub-clip EM is assigned so as to be represented in terms of the number of frames from the start of the sub-clip #23.

The generating unit 42 then generates sub-clip EM data in which is described
EssenceMark value="Nichiro homerun" frameCount="offset(23)"/
indicating the sub-clip EM, at the essence mark table portion.

Following the processing in step S32, the flow proceeds to step S33, where the editing unit 41 determines an in point based on the position within the clip to be edited which has been specified by the user as an in point, and the flow proceeds to step S34.

In step S34, the generating unit 42 reflects the section from the start to the in point of the clip to be edited in the sub-clip EM data generated in step S32. Specifically, the generating unit 42 moves the position at which the sub-clip EM is assigned, as described in the sub-clip EM data, to a later position, by an amount equivalent to that from the head of the clip to be edited to the in point.

For example, in the event that the Assemble Edit shown in FIG. 9 is to be performed, the generating unit 42 changes the value offset(23) of the attribute framecount in the description
EssenceMark value="Nichiro to batter's box" frameCount="offset(23)"/
of the sub-clip EM data generated in step S32, to a value ADur(21)+Dur(22)+offset(23), which is the number of frames of the section ADur(21)+Dur(22) which is, from the start to the in point, added to the offset(23).

In step S35, the editing unit 41 determines whether or not the input point is the end position of the clip to be edited, i.e., whether or not perform Assemble Edit as to the entirety of the clip to be edited, and in the event that determination is made that the input point is the end position of the clip to be edited, the flow proceeds to step S36.

In step S36, the editing unit 41 performs Assemble Edit wherein the sub-clip to be edited is added to the clip to be edited. After the processing in step S36, the flow proceeds to step S37, where the generating unit 42 describes an in point, i.e., a cut point EM of which the assigning position is the frame following the final frame of the clip to be edited, at the end of the essence mark table portion of the editing clip EM essence data (hereafter referred to as "editing clip EM data") recorded in the optical disc 21 in a manner correlated with the clip to be edited.

For example, in the case of performing the Assemble Edit shown in FIG. 9, the generating unit 42 adds a description
EssenceMark value="cut point" frameCount="ADur(21)"/
indicating the cut point EM having as the assigned position thereof the ADur(21)'th frame specified by the user as an in point, for example, after the last description
EssenceMark value="REC Start" frameCount="0"/
of the editing clip EM data.

After the processing in step S37, the flow proceeds to step S38, where the generating unit 42 adds, to the end of the essence mark table portion of the editing clip EM data described in step S37, the contents of the essence mark table portion of the sub-clip EM data obtained as the result of the reflection in step S34, thereby generating editing result EM data. Consequently, in the case of performing the Assemble Edit shown in FIG. 9, for example, the editing result EM data shown in FIG. 10 is generated. This editing result EM data is recorded in the optical disc 21 in a manner correlated with the editing result clip.

On the other hand, in the event that determination is made in step S35 that the in point is not the end position of the clip to be edited, the flow proceeds to step S39, where th editing unit 41 determines whether or not the position on the clip to be edited corresponding to the end position of the sub-clip to be edited is somewhere between the start position to the end position of the clip to be edited, i.e., whether or not to perform Insert Edit.

In step S39, in the event that determination is made that position on the clip to be edited corresponding to the end position of the sub-clip to be edited is not between the start position and the end position of the clip to be edited, the flow proceeds to step S40, and the editing unit 41 deletes the data of the clip to be edited between the in point to the end position, and the flow proceeds to step S41.

In step S41, the detecting unit 43 detects, of the editing clip EMs other than the editing clip EM indicating the start position of the clip to be edited that are described in the editing clip EM data of the clip to be edited, editing clip EMs assigned to data corresponding to the editing section from the in point to the position on the clip to be edited corresponding to the end position of the sub-clip, as invalid EMs, and supplies information for identifying the invalid EMS to the deleting unit 44, and the flow proceeds to step S42.

In step S42, the deleting unit 44 deletes the description of the invalid EMs from the editing clip EM data of the clip to be edited, based on information for identifying invalid EMs from the detecting unit 43, and the flow proceeds to the above-described step S36.

On the other hand, in the event that determination is made in step S39 that position on the clip to be edited corresponding to the end position of the sub-clip to be edited exists between the start position and the end position of the clip to be edited, the flow proceeds to step S43, and the editing unit 41 overwrites the editing section up to the position on the clip to be edited corresponding to the end position of the sub-clip, with the sub-clip. That is to say, the editing unit 41 performs Insert Edit of the sub-clip to the clip to be edited.

Following the processing in step S43, the flow proceeds to step S44, where the generating unit 42 describes cut point EMs having as the assigned positions thereof the start position and end position of the editing section, to predetermined positions in the essence mark table portion of the editing clip EM data of the clip to be edited.

For example, in the event of performing the Insert Edit shown in FIG. 11, the generating unit 42 describes the description
EssenceMark value="cut point" frameCount="In(31)"/
indicating a cut point EM having as the assigned position thereof the In(31)'th frame, which is the start position of the editing section, and the description
EssenceMark value="cut point" frameCount="In(31)+Dur(32)"/
indicating a cut point EM having as the assigned position thereof the In(31)+Dur(32)'th frame, which is the end position of the editing section, after the last description
EssenceMark value="REC Start" frameCount="0"/
of the editing clip EM data.

After the processing in step S44, the flow proceeds to step S45 where, in the same way as with step S41, the detecting unit 43 detects, of the editing clip EMs other than the editing clip EM indicating the start position of the clip to be edited that are described in the editing clip EM data of the clip to be edited, editing clip EMs assigned to data corresponding to the editing section, as invalid EMs.

For example, in the event of performing the Insert Edit shown in FIG. 11, the detecting unit 43 detects, of the editing clip EMs other than the editing clip EM "REC Start" that are described in the editing clip EM data of the clip #31, the editing clip EM indicating "Nichiro homerun" assigned to the data corresponding to the editing section, as an invalid EM. The detecting unit 43 then supplies information to the deleting unit 44 for identifying the invalid EM.

After the processing in step S45, the flow proceeds to step S46 where the deleting unit 44 deletes the description of the invalid EMs from the editing clip EM data of the clip to be edited, based on information for identifying invalid EMs from the detecting unit 43, in the same way as with step S42, and the flow proceeds to step S47.

In step S47, the generating unit 42 inserts the contents of the essence mark table portion of the sub-clip EM data to a position within the essence mark table portion of the editing clip EM data corresponding to the editing section, thereby generating editing result EM data.

For example, in the case that the Insert Edit shown in FIG. 13 has been performed, the description
EssenceMark value="Nichiro homerun" frameCount="In(31)+offset(42)"/
In the essence mark table portion of the sub-clip EM data is inserted between the description
EssenceMark value="cut point" frameCount="In(41)"/
and the description
EssenceMark value="cut point" frameCount="In(41)+Dur (42)"/
Corresponding to the editing section within the essence mark table portion of the editing clip EM data, thereby generating the editing result EM data shown in FIG. 14. The editing result EM data is recorded in the optical disc 21 in a manner correlated with the editing result clip.

As described above, with the editing processing unit 40, the generating unit 42 assigns editing clip EMs with no change to the editing result clip as editing result EMs. The detecting unit 43 detects editing clip EMs indicating the characteristics of video corresponding to the editing section, as invalid EMs, and the deleting unit 44 deletes the description of invalid EMs from the editing result ME data. Accordingly, consistency of essence marks can be completely ensured before and after editing.

Figure 16:
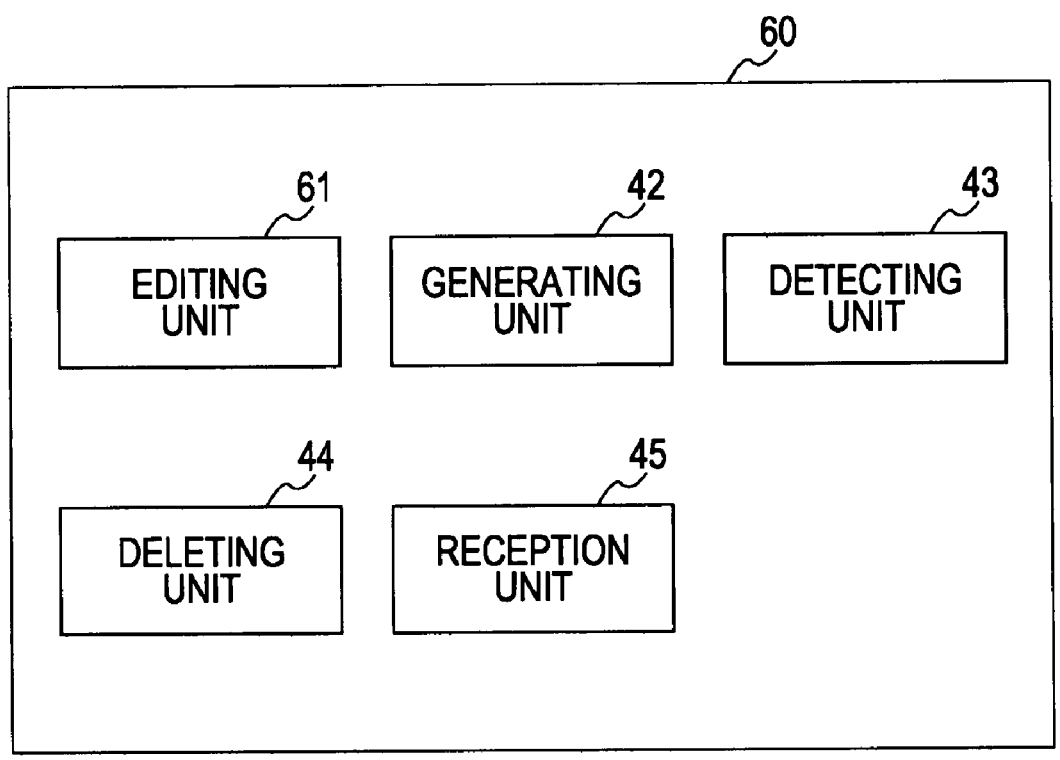
FIG. 16 is a diagram illustrating another configuration example of an editing processing unit.

FIG. 16 illustrates another functional configuration example of an editing processing unit.

The editing processing unit 60 shown in FIG. 16 is configured of a generating unit 42, detecting unit 43, deleting unit 44, reception unit 45, and editing unit 61, and performs non-linear editing (non-destructive editing). Components the same as those in FIG. 4 are denoted with the same reference numerals, and description thereof will be omitted.

The editing unit 61 generates editing description data (shown in the later-described FIG. 18) representing the contents of Assemble Edit or Insert Edit, in response to control signals corresponding to commands input from the input unit 16 shown in FIG. 3, that are supplied from the reception unit 45, thereby performing non-destructive Assemble Edit or Insert Edit. Also, if necessary, the editing unit 61 records data obtained by connecting clips recorded in the optical disc 21 in accordance with the editing description data, as editing result clips of completed packets, in another optical disc (not shown) or the like.

Figure 17:
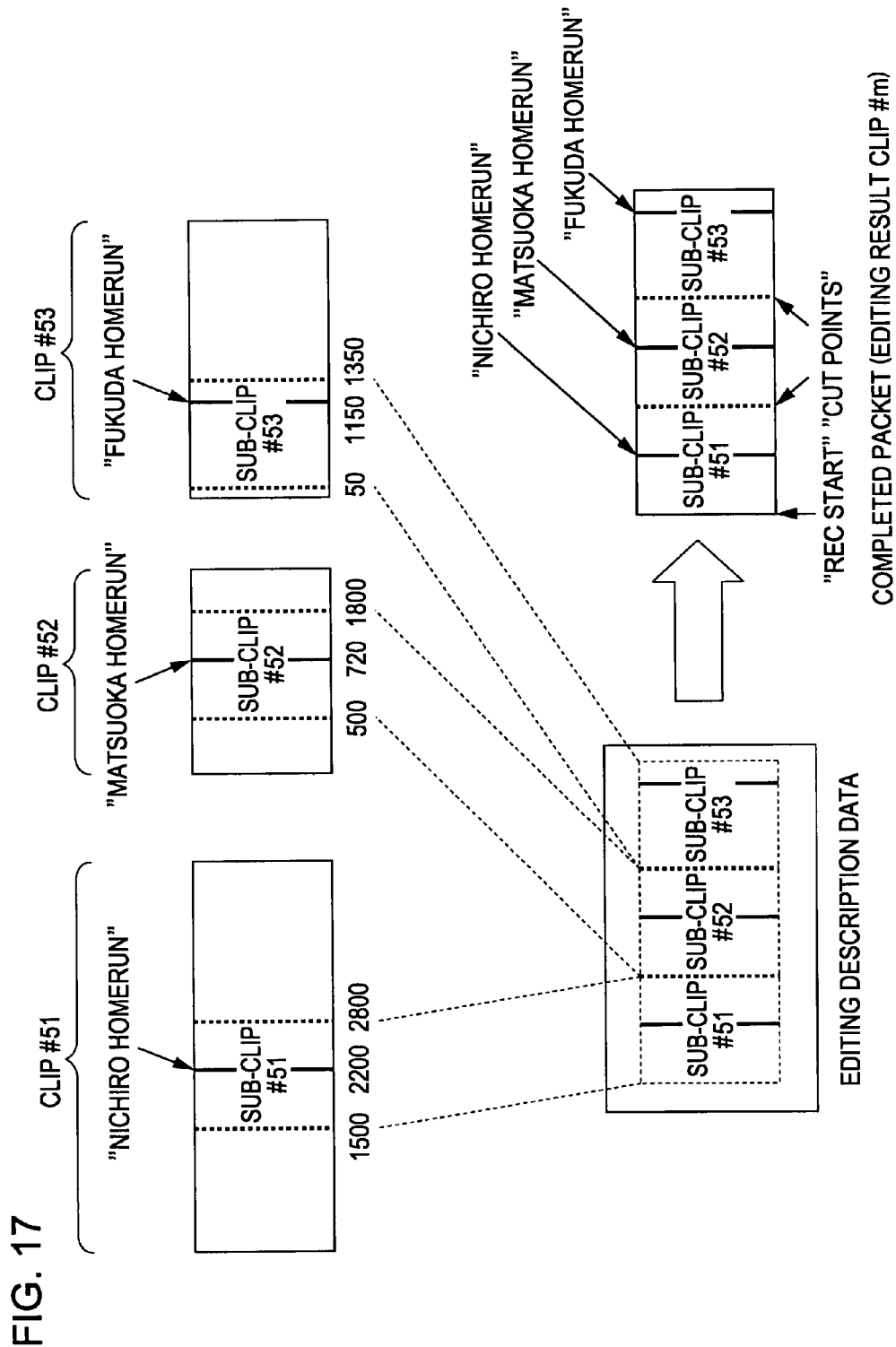
FIG. 17 is a diagram for describing non-destructive Assemble Edit.
Figure 20:
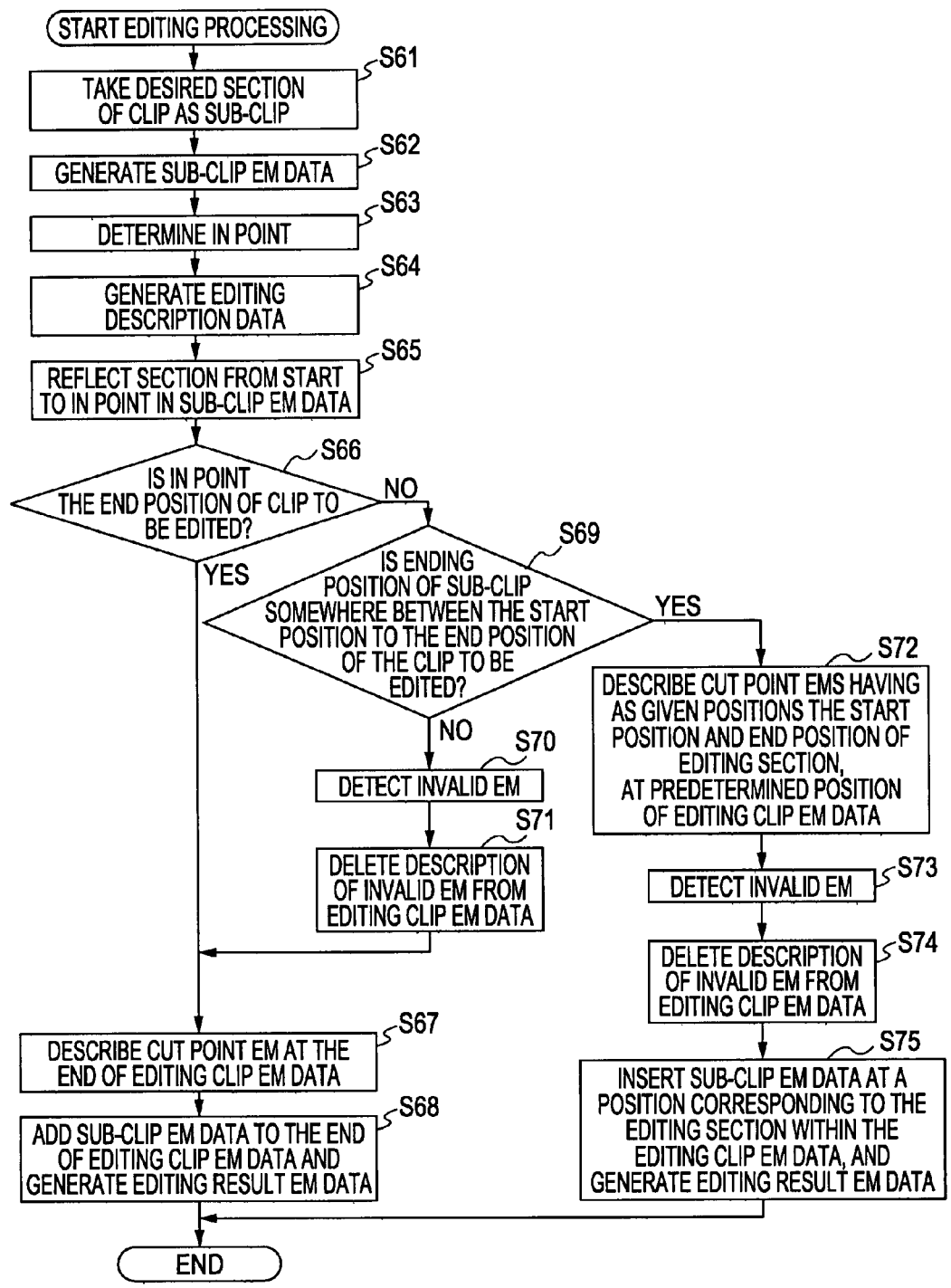
FIG. 20 is a flowchart for describing other editing processing.

FIG. 17 is a diagram for describing non-destructive Assemble Edit which the editing unit 61 shown in FIG. 16 performs.

Note that in the example shown in FIG. 17, the clips #51 through #53 are clips obtained by shooting a baseball game wherein Nichiro, Matsuoka, and Fukuda, hit homeruns, respectively.

As shown in FIG. 17, the 2200'th frame of clip #51 has assigned thereto an essence mark indicating "Nichiro homerun". Also, the 720'th frame of clip #52 has assigned thereto an essence mark indicating "Matsuoka homerun". Further, the 1150'th frame of clip #53 has assigned thereto an essence mark indicating "Fukuda homerun".

In the event of creating a digest video including only the homerun scenes included in the clips #51 through #53, the user gives commands for specifying sections which are sub-clips #51 through #53 of the clips #51 through #53.

In the example in FIG. 17, first, the user specifies a section of around 40 seconds in footage time, from the 1500'th frame to the 2800'th frame of the clip #51, as sub-clip #51, and gives a command to specify the 0'th frame of the editing result as the in point.

The editing unit 61 generates editing description data representing the contents of the Assemble Edit wherein the sub-clip #51 is taken as the data from the 0'th frame of a single editing result clip #m, in response to control signals corresponding to the command.

As shown in FIG. 17, at this time, the generating unit 42 newly generates an essence mark indicating "REC Start", and assigns this as an editing result EM to the 0'th frame of the editing result clip #m, which is the start position of the editing section specified by the user as an in point. Also, the generating unit 42 assigns, to the editing result clip #m, the sub-clip EM indicating "Nichiro homerun" assigned to the 700'th frame of the sub-clip #51, as an editing result EM with the corresponding position on the editing result clip #m as the assigned position thereof.

Next, the user specifies a section from the 500'th frame to the 1800'th frame of the clip #52, and gives a command to specify the 1300'th frame, i.e., the end position, of the editing result clip #m obtained by the immediately prior Assemble Edit which serves as the clip to be edited, as the in point.

The editing unit 61 generates editing description data representing the contents of the Assemble Edit wherein the sub-clip #52 is taken as the data to be placed following the end position of the sub-clip #51 in the editing result clip #m. As shown in FIG. 17, at this time, the generating unit 42 newly generates a cut point EM indicating the start position of the editing section, and assigns this as an editing result EM to the 1300'th frame of the editing result clip #m, which is the start position of the editing section specified by the user as an in point. Also, the generating unit 42 assigns, to the editing result clip #m, the sub-clip EM indicating "Matsuoka homerun" assigned to the 200'th frame of the sub-clip #52, as an editing result EM with the corresponding position on the editing result clip #m as the assigned position thereof.

Finally, the user specifies a section from the 50'th frame to the 1350'th frame of the clip #53, and gives a command to specify the 2600'th frame, i.e., the end position, of the editing result clip #m obtained by the immediately prior Assemble Edit which serves as the clip to be edited, as the in point.

As with the case of the sub-clip #52, the editing unit 61 generates editing description data representing the contents of the Assemble Edit wherein the sub-clip #53 is taken as the data to be placed following the end position of the sub-clip #52 in the editing result clip #m. As shown in FIG. 17, at this time, the generating unit 42 newly generates a cut point EM indicating the start position of the editing section, and assigns this as an editing result EM to the 2600'th frame of the editing result clip #m, which is the start position of the editing section specified by the user as an in point. Also, the generating unit 42 assigns, to the editing result clip #m, the sub-clip EM indicating "Fukuda homerun" assigned to the 1100'th frame of the sub-clip #53, as an editing result EM with the corresponding position on the editing result clip #m as the assigned position thereof.

As described above, with cases of performing non-destructive Assemble Edit as well, in the event that sub-clip EMs are already assigned to the sub-clips #51 through #53 to be edited, the generating unit 42 assigns the sub-clip EMs to the position in the editing result clip #m corresponding to the assigned positions thereof, as editing result EMs. Thus, sub-clip EMs already assigned to the sub-clips #51 through #53 to be subjected to Assemble Edit can be succeeded in the editing result clip #m obtained as a result of the editing.

Following the editing description data thus generated, the editing unit 61 records the editing result obtained by serially connecting the sub-clip #51 through sub-clip #53 in a new optical disc, as a complete-packet editing result clip #m. Thus, a digest video of only the homerun scenes included in the clips #51 through 53 is recorded in the new optical disc as the editing result clip #m. Also, the generating unit 42 records the editing result EM data describing the editing result EMs assigned to the editing result clip #m, in a manner correlated with the editing result clip #m.

FIG. 18 is a diagram illustrating an example of editing description data generated by the editing unit 61 shown in FIG. 61 as the result of the non-destructive Assemble Edit shown in FIG. 17.

Note that with the example shown in FIG. 18, the editing description data is described in a language similar to SMIL (Synchronized Multimedia Integration Language). Also, the line numbers in FIG. 18 have been added for the sake of description, and are not a part of the language.

As shown in FIG. 18, description of the editing description data file is primarily configured of a body portion defined by body tags (<body></body>). In the example in FIG. 18, the body portion is described in lines 3 through 5.

More specifically, descriptions defining the sub-clips in the order of playback are arrayed in the body portion. In the example in FIG. 18, description is made for the video element in line 3 regarding the clip to refer to and the section to take as a sub-clip. The description in line 3 of src="Clip 51" means that the clip to refer to is clip #51.

The subsequent description in line 3 of clipBegin="1500" indicates the starting position of the section in clip #51 to take as the sub-clip #51, in terms of number of frames. Further, the subsequent description in line 3 of clipEnd="2800" indicates the ending position of the section in clip #51 to take as the sub-clip #51, in terms of number of frames.

Accordingly, in the example in FIG. 16, the editing description data describes to play the 1500'th frame through the 2800'th frame of the clip #51 as the sub-clip #51.

Also, description is made for the video element in line 4 to play the 500'th frame through the 1800'th frame of the clip #52 as the sub-clip #52. Further, description is made for the video element in line 5 to play the 50'th frame through the 1350'th frame of the clip #53 as the sub-clip #53. Description is made in the editing description list in FIG. 18 to play the above sub-clip #51 through sub-clip #53 in order.

Accordingly, the editing unit 61 plays the sub-clip #51 through sub-clip #53 in order in accordance with the editing description data shown in FIG. 18, and connects the sub-clip #51 through sub-clip #53 in the order of playback and stores this in a new optical disc, whereby the editing result clip #m can be recorded in a new optical disc.

FIG. 19 is a diagram illustrating an example of editing result EM data recorded in a manner correlated with the editing result clip #m shown in FIG. 17.

Line 1 in FIG. 19 describes
targetEssence="Clip m"
which indicates that this editing result EM data is editing result EM data describing editing result EMs assigned to the editing result clip #m.

At line 2 in FIG. 19, the description
EssenceMark value="REC Start" frameCount="0"/
indicates that the characteristic indicated by the editing result EM is "REC Start", and that the position of assigning thereof is the 0'th frame of the editing result clip #m.

At line 3 in FIG. 19, the description
EssenceMark value="Nichiro homerun" frameCount="700"/
indicates that the characteristic indicated by the editing result EM is "Nichiro homerun", and that the position of assigning thereof is the 700'th frame, i.e., the 700'th frame from the start of the sub-clip #51.

Further, line 4 in FIG. 19 has the description
EssenceMark value="cut point" frameCount="1300"/
which indicates that the characteristic indicated by the editing result EM is "cut point", and that the position of assigning thereof is the 1300'th frame, i.e., the in point specified by the user at the time of Assemble Edit of the sub-clip #52.

At line 5 in FIG. 19, the description
EssenceMark value="Matsuoka homerun" frameCount="1520"/
indicates that the characteristic indicated by the editing result EM is "Matsuoka homerun", and that the position of assigning thereof is the 1520'th frame, i.e., the 220'th frame from the start of the sub-clip #52.

Further, line 6 in FIG. 19, has the description
EssenceMark value="cut point" frameCount="2600"/
which indicates that the characteristic indicated by the editing result EM is "cut point", and that the position of assigning thereof is the 2600'th frame, i.e., the in point specified by the user at the time of Assemble Edit of the sub-clip #53.

At line 7 in FIG. 19, the description
EssenceMark value="Fukuda homerun" frameCount="3700"/
indicates that the characteristic indicated by the editing result EM is "Fukuda homerun", and that the position of assigning thereof is the 3700'th frame, i.e., the 1100'th frame from the start of the sub-clip #53.

Next, description will be made regarding the editing processing wherein the editing processing unit 60 shown in FIG. 16 performs non-destructive Assemble Edit or Insert Edit on a clip. This editing processing is started when a user specifies a clip to be edited, for example.

In step S61, in the same way as with step S31, the editing unit 61 takes data of a desired section of a desired clip as a sub-clip, in response to control signals corresponding to control signals supplied from the reception unit 45.

Following the processing in step S61, the flow proceeds to step S62, where in the same way as with step S32, the generating unit 42 generates essence mark data of sub-clip EMs based on the essence mark data in the clip corresponding to the sub-clip.

Following the processing in step S62, the flow proceeds to step S63, where the editing unit 61 determines an in point based on the position within the clip to be edited which has been specified by the user as an in point, and the flow proceeds to step S64.

The flow proceeds to step S64, where the editing unit 61 generates editing description data based on the start position and end position of the section of the clip taken as a sub-clip, and on the in point. For example, in the case of performing the Assemble Edit shown in FIG. 17, the editing unit 61 generates editing description data describing
video src="Clip 51" clipBegin="1500" clipEnd="2800"
at line 3 which is the first line of the body portion as shown in FIG. 18, based on the 1500'th frame which is the start position of the section of the clip #51 which is taken as the sub-clip #51, the 2800'th frame which is the end position thereof, and the 0'th frame which is the in point.

The processing in steps S65 and S66, steps S67 through S69, steps S70 and 71, and steps S72 through 75, is the same as the processing in steps S34 and S35, steps S37 through S39, steps S41 and 42, and steps S44 through 47; accordingly, description thereof will be omitted.

Note that while description has been made regarding FIGS. 17 through 20 that a clip itself is used to perform Insert Edit or Assemble Edit, but an arrangement may be made wherein Insert Edit or Assemble Edit is performed using proxy data, wherein the bit rate of the clip has been lowered.

Also, while the deleting unit 44 deletes all invalid EMs in the above description, there are invalid EMs which are meaningful to be succeeded in the editing result clip. For example, in the event that an invalid EM indicates the start position of a certain state as the characteristic, even if the data of that position is deleted by overwriting, the fact that the undeleted data is a continuation of that state can be indicated by succession in the editing result clip.

Figure 21:
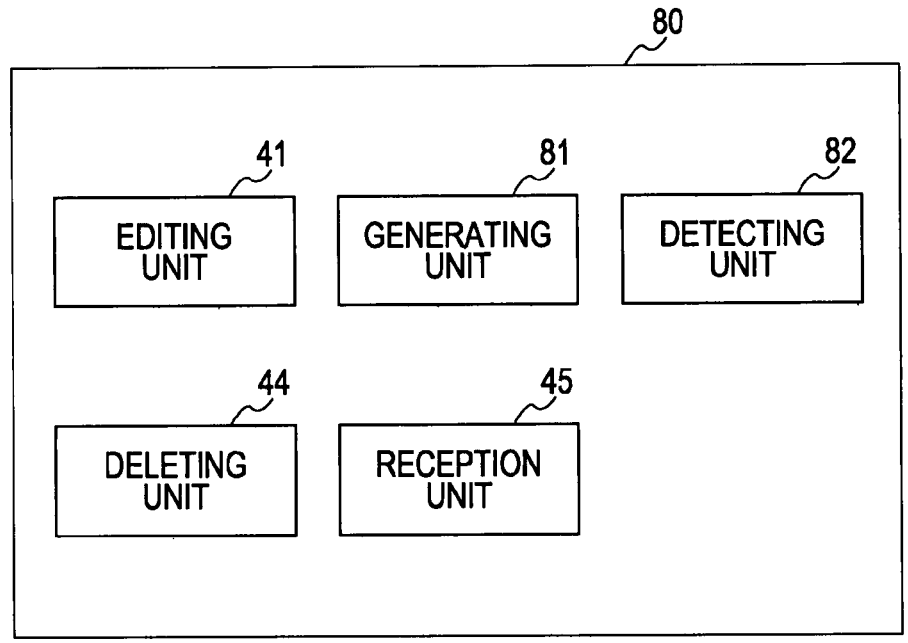
FIG. 21 is a diagram illustrating another configuration example of an editing processing unit.

Taking this into consideration, FIG. 21 shows editing processing in a case wherein invalid EMs, which are meaningful to be succeeded, are not deleted. Note that in this case, succession information indicating whether or not to succeed to the editing result clip is added to the essence marks. This succession information is added to the essence mark by the user giving a command at the time of assigning the essence mark by specifying a desired position and characteristics of the video at that position, for example.

The editing processing unit 80 shown in FIG. 21 is configured of the editing unit 41, deleting unit 44, reception unit 45, generating unit 81, and detecting unit 82, and performs linear editing. Components the same as those in FIG. 4 are denoted with the same reference numerals, and description thereof will be omitted.

The generating unit 81 takes characteristics indicated by invalid EMs to which are assigned succession information representing succession in the editing result clip as characteristics at a particular position in the editing result clip, based on control signals supplied from the reception unit 45 and information for identifying invalid EMS supplied from the detecting unit 82, and assigns essence marks indicating such characteristics (hereafter referred to as "succession EM") to the editing result clip as editing result EMS.

In the same way as with the generating unit 42 shown in FIG. 4, the generating unit 81 assigns editing clip EMs with no change to the editing result clip as editing result EMs, in response to control signals supplied from the reception unit 45. Also in the same way as with the generating unit 42, the generating unit 81 assigns sub-clip EMS and cut point EMS to the editing result clip as editing result EMS, in response to control signals supplied from the reception unit 45.

Further, in the same way as with the generating unit 42, the generating unit 81 generates editing result EMs as predetermined position EMS, in response to control signals corresponding to user operations at the input unit 16, for specifying predetermined positions in the editing video supplied from the reception unit 45. Also, in the same way as with the generating unit 42, the generating unit 81 generates editing result EM data describing editing result EMs, and records this in a manner correlated with the editing result clip.

In the same way as with the detecting unit 43, the detecting unit 82 detects, of the editing clip EMs other than the editing clip EM indicating the start position of the clip to be edited that are described in the editing clip EM data of the clip to be edited, editing clip EMs indicating the characteristics of the video corresponding to the editing section, as invalid EMS, in response to control signals supplied from the reception unit 45. The detection unit 82 supplies information for identifying the detected invalid EMs to the deleting unit 44 and generating unit 81.

Next, Insert Edit performed by the editing unit 41 shown in FIG. 21, and the editing result EM data generated by the generating unit 81 in conjunction therewith, will be described with reference to FIGS. 22 and 23.

An example will be described in FIG. 22 where the clip #5 shown in FIG. 5 is the clip to be edited, with Insert Edit being performed of a sub-clip #71 thereto. Here, in the clip #5, succession information indicating succession to the editing result clip is added to the editing clip EM indicating "top of the second inning", and succession information indicating no succession to the editing result clip is added to the editing clips EM indicating "Nichiro to batter's box" and "Nichiro homerun".

These will be distinguished in the following as follows. Let us say that there is an editing clip EM "j". An editing clip EM to which succession information indicating succession to the editing result clip has been added, will be prefixed with an underscore "_", i.e., will be written as "_j". On the other hand, an editing clip EM to which succession information indicating no succession to the editing result clip has been added, will be written simply as "j".

Figure 22:
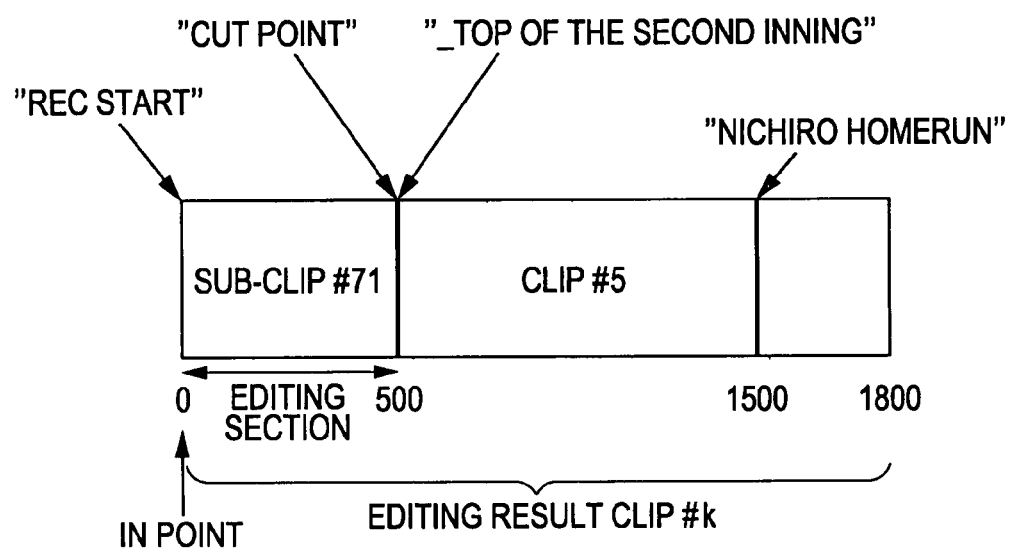
FIG. 22 is a diagram for describing other Insert Edit.

As shown in FIG. 22, upon the user specifying a section of the clip #71 of 500 frames to take as the sub-clip #71, and specifying the 0'th frame of the clip #5 as an in point, the editing unit 41 takes the section between the 0'th frame and 500'th frame of the clip #5 as an editing section, overwrites the editing section with the sub-clip #71, and takes the data obtained as a result thereof as an editing result clip #k. Note that in the example in FIG. 22, no sub-clip EM has been assigned to the sub-clip #71.

Of the editing clip EMs other than the editing clip EM indicating "REC Start", the detecting unit 82 detects the editing clip EM indicating "_top of the second inning" assigned to the 10'th frame, and the editing clip EM indicating "Nichiro to batter's box" assigned to the 300'th frame, which are positions within the section between the 0'th frame and the 500'th frame which is the editing section, and supplies information for identifying the invalid EMs to the deleting unit 44 and generating unit 81.

The generating unit 81 newly generates cut point EMs to be assigned to the start position and end position of the editing section, and assigns these as editing result EMs to the editing result clip #k. Note that in this case, the position specified as the in point is the 0'th frame, to which position the editing clip EM indicating "REC Start" is succeeded, so generating and assigning of a cut point EM for the start position of the editing section is omitted. Also, the generating unit 81 assigns the editing clip EMS indicating "REC Start", "_top of the second inning", "Nichiro to batter's box", and "Nichiro homerun", that have been assigned to the clip #5, without change to the editing result clip #k as editing result EMs.

Further, based on information for identifying invalid EMs from the detecting unit 82, the generating unit 81 effects succession of the characteristic "_top of the second inning" which the invalid EM attached with succession information representing succession to the editing result clip indicates, as the characteristic of the position in the editing result clip #k corresponding to the end position of the editing section, and assigns the succession EM indicating "_top of the second inning" to the editing result clip #k as an editing result EM. That is to say, the succession EM indicating "_top of the second inning" is assigned to the 500'th frame, which is the end position of the editing section.

Thus, at the editing processing unit 80, the invalid EM indicating "_top of the second inning", attached with succession information representing succession to the editing result clip, is succeeded in the editing result clip #k as a succession EM, so the user can use the succession EM to know that the data following the position where the succession EM has been assigned is data obtained as a result of shooting the top of the second inning of the baseball game, or later. Consequently, the user can easily view video (including audio) of the top of the second inning of the baseball game and later, for example, by instructing playback of the succession EM of the clip #k and later, recorded in the optical disc 21.

The deleting unit 44 deletes description of invalid EMs from the editing result EM data, based on information of r identifying invalid EMs from the detecting unit 82.

As described above, the clip #k which is editing results, is assigned with the editing result EMs of the cut point EM indicating "REC Start" which is assigned to the 0'th frame, the cut point EM indicating "cut point" and the succession EM indicating "_top of the second inning" which is assigned to the 500'th frame, and the editing clip EM indicating "Nichiro homerun" which is assigned to the 1500'th frame. The editing result EM data describing these editing result EMs is shown in FIG. 23.

Line 1 in FIG. 23 describes
targetEssence="Clip k"
which indicates that this editing result EM data is editing result EM data describing editing result EMs assigned to the editing result clip #k.

At line 2 in FIG. 23, the description
EssenceMark value="REC Start" frameCount="0"/
indicates that the characteristic indicated by the editing result EM is "REC Start", and that the position of assigning thereof is the 0'th frame of the editing result clip #k.

At line 3 in FIG. 23, the description
EssenceMark value="_top of the second inning" frameCount="500"/
indicates that the characteristic indicated by the editing result EM is "top of the second inning", and that the position of assigning thereof is the 500'th frame from the start, i.e., the ending position of the editing section. Also, the underscore "_" in the "_top of the second inning" which is the value of the attribute EssenceMark value indicates that this is a succession EM to which succession information, representing succession to the editing result clip, has been added.

At line 4 in FIG. 23, the description
EssenceMark value="cut point" frameCount="500"/
indicates that the characteristic indicated by the editing result EM is "cut point", and that the position of assigning thereof is the 500'th frame from the start, i.e., the ending position of the editing section.

Further, at line 5 in FIG. 23, the description
EssenceMark value="Nichiro homerun" frameCount="1500"/
indicates that the characteristic indicated by the editing result EM is "Nichiro homerun", and that the position of assigning thereof is the 1500'th frame from the start.

Figure 24:
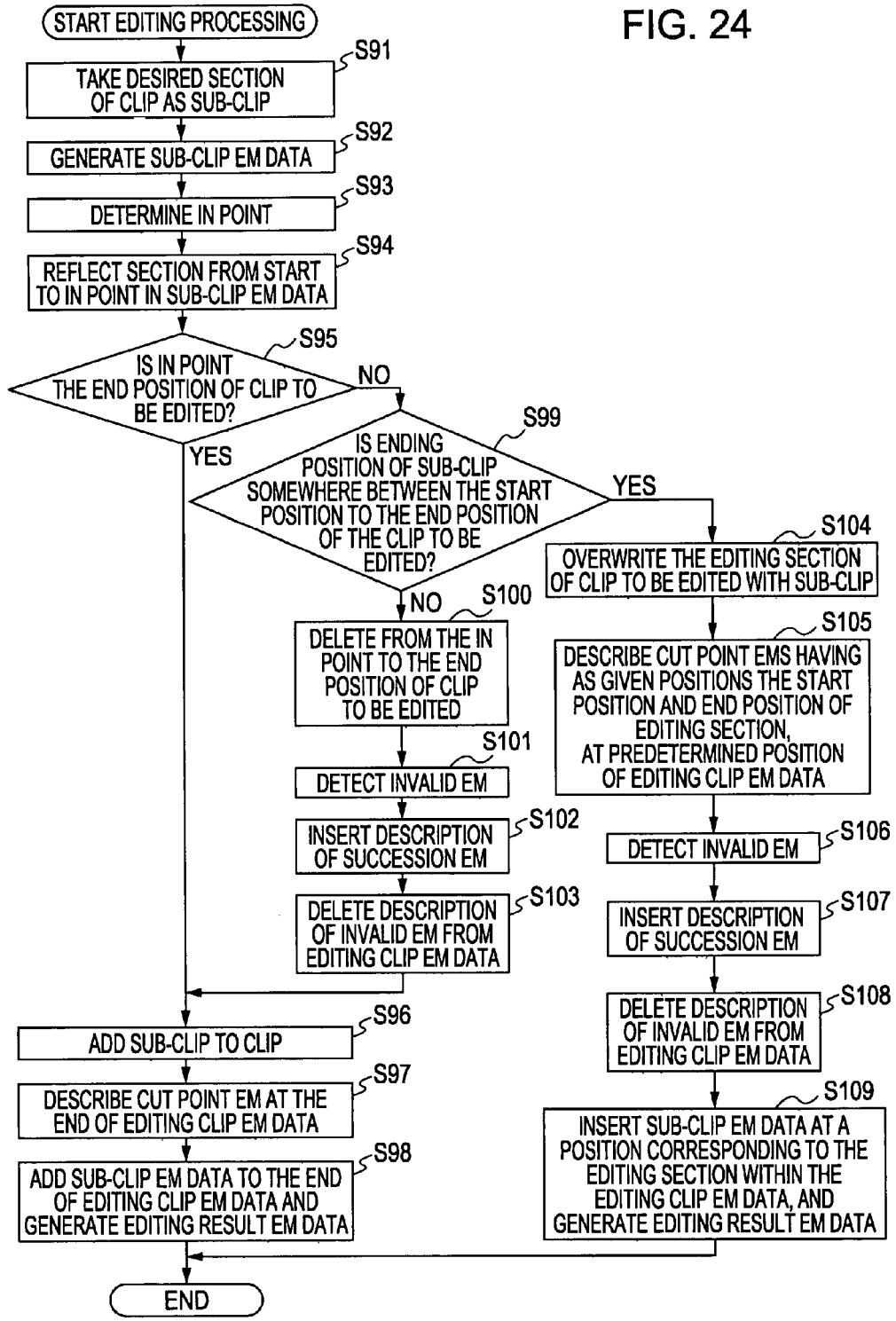
FIG. 24 is a flowchart for describing yet other editing processing.

Next, the editing processing wherein the editing processing unit 80 shown in FIG. 21 performs Assemble Edit or Insert Edit on a clip will be described with reference to FIG. 24. This editing processing is started upon a clip to be edited being specified by the user, for example.

Figure 15:
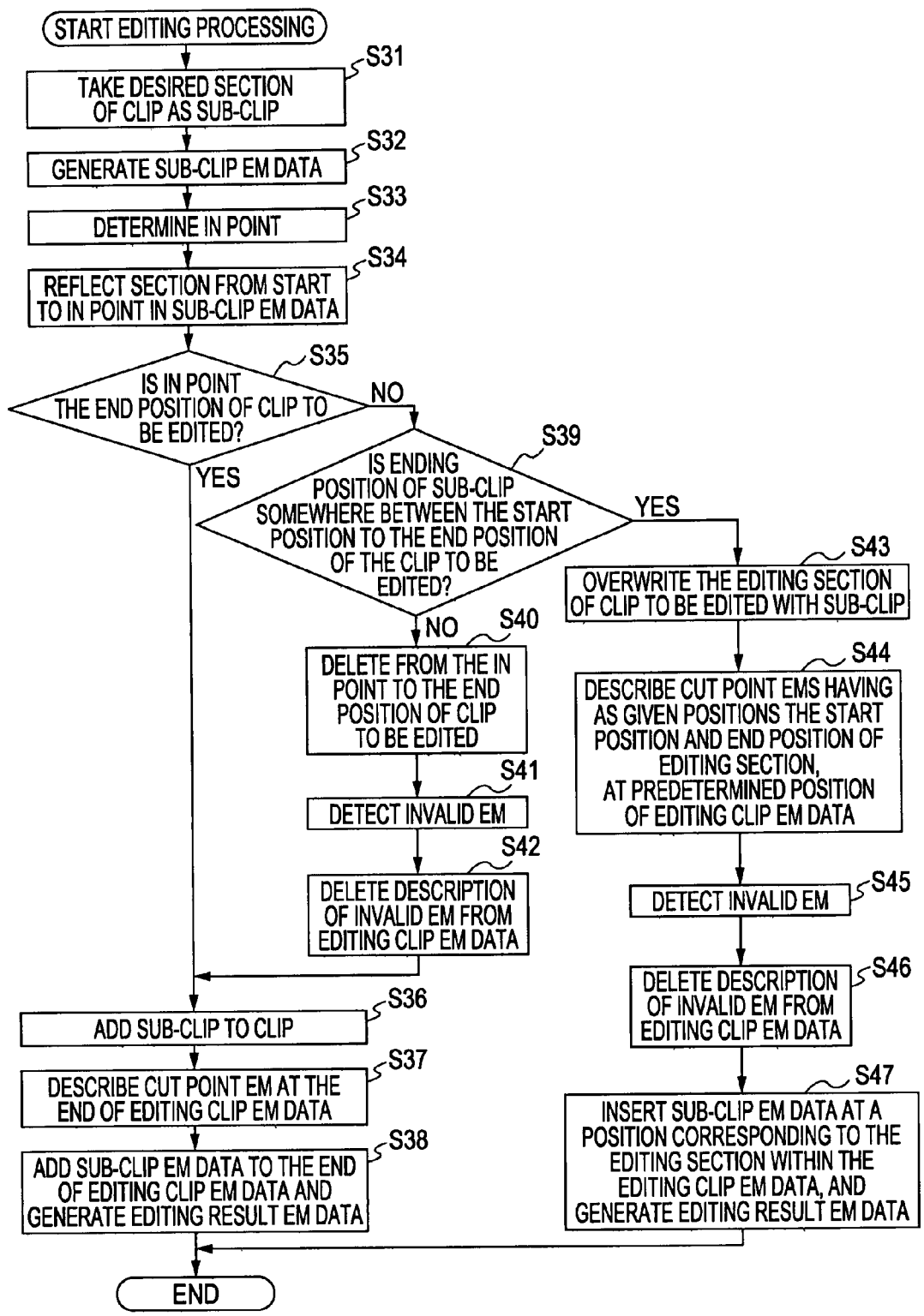
FIG. 15 is a flowchart for describing editing processing.

The processing of step S91 through step S101 is the same as the processing of step S31 through step S41 in FIG. 15, so description thereof will be omitted.

In step S102, the generating unit 81 inserts description of the succession EM assigned to the end position of the editing section, to a position in the essence mark table portion of the editing clip EM data recorded in a manner correlated with the clip to be edited that corresponds to the end position of the editing section, based on information for identifying invalid EMs from the detecting unit 82.

The processing of step S103 through step S106 is the same as the processing of step S42 through step S45 in FIG. 15, so description thereof will be omitted.

In the same way as with step S102, in step S107 the generating unit 81 inserts description of the succession EM assigned to the end position of the editing section, to a position in the essence mark table portion of the editing clip EM data recorded in a manner correlated with the clip to be edited that corresponds to the end position of the editing section, based on information for identifying invalid EMs from the detecting unit 82.

For example, in the case of performing the Insert Edit shown in FIG. 22, the generating unit 81 assigns, of the invalid EMs, the invalid EM indicating "_top of second inning" to which succession information representing succession in the editing result clip has been attached, to the 500'th frame which is the end position of the editing section, as a succession EM. Also, the generating unit 81 describes the succession EM description
EssenceMark value="_top of the second inning" frameCount="500"/
immediately before the
EssenceMark value="cut point" frameCount="500"/
which is the position of the essence mark table portion of the editing clip EM data corresponding to the end position of the editing section.

The processing of step S108 and step S109 is the same as the processing of step S46 and step S47 in FIG. 15, so description thereof will be omitted.

While description has been made above that the generating unit 81 assigns all invalid EMs to which succession information indicating succession in the editing result clip, as succession EMs, an arrangement may be made wherein, in the event that there are multiple invalid EMs to which succession information indicating succession in the editing result clip, only that assigned the position closest to the end position of the editing section is assigned as a succession EM.

Also, an arrangement may be made wherein, instead of the user assigning succession information at the time of creating an essence mark, the deleting unit 44 prompts the user on whether to delete the invalid EM, at the time of deleting invalid EMs.

Also, while with the above description, cut point EMs are the only newly-generated essence marks, but in the event of a user specifying a desired position, and characteristics of the video at that potion, while editing, a desired position EM is also newly generated. Thus, the user can use a desired position EM following editing to view video and listen to audio.

Also, while the position of essence marks has been represented in terms of frames from the start of the clip with the above-descried embodiment, any information can be used to represent this, as long as frames can be uniquely identified. For example, the position of essence marks can be been represented in terms of time code.

Further, essence mark data has been described as separately describing clips and essence marks, but an arrangement may be made wherein essence mark information is included in the clip.

It should be noted that the steps describing the program stored in the program recording medium may of course be executed in the time-sequence described, but this is not restricted to being executed in the described time-sequence, and may be executed in parallel or individually.

It should be understood by those skilled in the art that various modifications, combinations, sub-combinations and alterations may occur depending on design requirements and other factors insofar as they are within the scope of the appended claims or the equivalents thereof.

What is claimed is:

1. An editing apparatus for performing editing in which a second video is added to or inserted into a first video, said apparatus comprising:
   an editing unit for performing said editing;
   a generating unit for generating a first electronic mark indicating a characteristic of said first video, as an edited video electronic mark, which is an electronic mark indicating characteristics of an edited video obtained as the result of said editing;
   a detecting unit for detecting the first electronic mark;
   a determining unit for determining whether the first electronic mark is an invalid electronic mark,
   wherein the detected first electronic mark is determined to be an invalid electronic mark when (1) the detected first electronic mark is detected between an in point position and an end position of the first video in a case where an ending position of the second video is not between a start position of the first video or an end position of the first video, or (2) the detected first electronic mark is between an in point position and an out point position of the first video in a case where an ending position of the second video is between a start position of the first video and an end position of the first video;
   a deleting unit for deleting said invalid electronic mark from said edited video electronic marks.

2. The editing apparatus according to claim 1, wherein said generating unit further generates a second electronic mark indicating characteristics of said second video, as said edited video electronic mark.

3. The editing apparatus according to claim 1, wherein said generating unit further generates a section electronic mark which is an electronic mark indicating at least one of a start position and end position of said editing section as characteristics of said edited video, as said edited video electronic mark.

4. The editing apparatus according to claim 1, further comprising a reception unit receiving operations to specify a desired position for said edited video by a user;
   wherein said generating unit generates a desired position electronic mark which is an electronic mark indicating characteristics of said edited video at said desired position, as said edited video electronic mark, in response to said operations.

5. The editing apparatus according to claim 1, wherein said first electronic mark has added thereto succession information representing whether or not first electronic mark is to be succeeded in the edited video;
   and wherein said generating unit effects succession of the characteristics indicated by, of said invalid electronic marks, an invalid mark to which succession information representing succession in the edited video has been added, as characteristics at a predetermined position of said edited video, and generates a succession electronic mark indicating the characteristics as said edited video electronic mark.

6. An editing method of an editing apparatus for performing editing in which a second video is added to or inserted into a first video, said method comprising the steps of:
   performing said editing;
   generating a first electronic mark indicating a characteristic of said first video, as an edited video electronic mark, which is an electronic mark indicating characteristics of an edited video obtained as the result of said editing;
   detecting the first electronic mark;
   a determining unit for determining whether the first electronic mark is an invalid electronic mark,
   wherein the detected first electronic mark is determined to be an invalid electronic mark when (1) the detected first electronic mark is detected between an in point position and an end position of the first video in a case where an ending position of the second video is not between a start position of the first video or an end position of the first video, or (2) the detected first electronic mark is between an in point position and an out point position of the first video in a case where an ending position of the second video is between a start position of the first video and an end position of the first video;
   deleting said invalid electronic mark from said edited video electronic marks.

7. A non-transitory computer readable medium embodied with a program for causing a computer to execute editing processing in which a second video is added to or inserted into a first video, said program comprising the steps of:
   performing said editing;
   generating a first electronic mark indicating a characteristic of said first video, as an edited video electronic mark, which is an electronic mark indicating characteristics of an edited video obtained as the result of said editing;
   detecting the first electronic mark;
   a determining unit for determining whether the first electronic mark is an invalid electronic mark,
   wherein the detected first electronic mark is determined to be an invalid electronic mark when (1) the detected first electronic mark is detected between an in point position and an end position of the first video in a case where an ending position of the second video is not between a start position of the first video or an end position of the first video, or (2) the detected first electronic mark is between an in point position and an out point position of the first video in a case where an ending position of the second video is between a start position of the first video and an end position of the first video; and
   deleting said invalid electronic mark from said edited video electronic marks.

* * * * *